United States Patent
Pitigoi-Aron

(10) Patent No.: US 10,707,984 B2
(45) Date of Patent: Jul. 7, 2020

(54) TECHNIQUES FOR SYNCHRONIZING SLAVE DEVICES

(71) Applicant: QUALCOMM Incorporated, San Diego, CA (US)

(72) Inventor: Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/025,863

(22) Filed: Jul. 2, 2018

(65) Prior Publication Data

US 2019/0020433 A1 Jan. 17, 2019

Related U.S. Application Data

(60) Provisional application No. 62/532,553, filed on Jul. 14, 2017.

(51) Int. Cl.
*H04J 3/06* (2006.01)
*H04Q 9/04* (2006.01)
(Continued)

(52) U.S. Cl.
CPC ............ *H04J 3/0685* (2013.01); *G01D 21/00* (2013.01); *G06F 1/12* (2013.01); *G06F 1/14* (2013.01);
(Continued)

(58) Field of Classification Search
CPC ......... G06F 1/12; H04J 3/0638; H04J 3/0661; H04J 3/0685; H04J 3/0697; H04L 7/0008;
(Continued)

(56) References Cited

U.S. PATENT DOCUMENTS 9,106,353 B2 8/2015 Hsueh et al.
9,579,025 B1 2/2017 Ramlall
(Continued)

FOREIGN PATENT DOCUMENTS

DE 102016214058 A1 2/2017
WO 2017070588 A1 4/2017

OTHER PUBLICATIONS

Huck T., et al., "Precise Timestamping and Temporal Synchronization in Multi-Sensor Fusion", Intelligent Vehicles Symposium (IV), 2011 IEEE, IEEE, Jun. 5, 2011, XP031998982, pp. 242-247.
(Continued)

*Primary Examiner* — Marsha D Banks Harold
*Assistant Examiner* — Elton Williams
(74) *Attorney, Agent, or Firm* — Loza & Loza LLP

(57) ABSTRACT

Disclosed are methods and apparatus for calculating sensor timing corrections at a sensor device. The methods and apparatus determine a sampling period as a number of cycles of an internal clock counted while a configured number of samples is captured in a slave device, determine a time interval between samples using an offset from a time of an observed occurrence of a hardware event on a communication link, the offset being received in a command from a master device, and adjust the time interval between samples by iterative digital approximation to correct for differences between timing of the slave device and the master device while concurrently calculating a watermark time corresponding to a sample start time configured by the master device for one or more slave devices.

26 Claims, 12 Drawing Sheets

(51) Int. Cl.
  *G01D 21/00* (2006.01)
  *G06F 1/14* (2006.01)
  *G06F 1/12* (2006.01)
  *H04L 29/08* (2006.01)
  *H04W 56/00* (2009.01)
  *H04W 84/18* (2009.01)

(52) U.S. Cl.
  CPC ............ *H04J 3/0638* (2013.01); *H04L 67/12* (2013.01); *H04Q 9/04* (2013.01); *H04W 56/001* (2013.01); *H04W 56/0045* (2013.01); *H04W 56/0055* (2013.01); *H04Q 2209/845* (2013.01); *H04W 84/18* (2013.01)

(58) Field of Classification Search
  CPC ....... H04L 7/0016; H04L 7/0037; H04L 7/06; H04Q 9/04; H04Q 2209/753; H04Q 2209/845; H04W 56/001; H04W 56/0045; H04W 56/0055; G04G 7/00; H03M 1/0607
  See application file for complete search history.

(56) References Cited

U.S. PATENT DOCUMENTS

| | | | |
|---|---|---|---|
| 9,924,245 | B2 | 3/2018 | Zhuge et al. |
| 2015/0077217 | A1 | 3/2015 | Lammel et al. |
| 2015/0134996 | A1* | 5/2015 | Pitigoi-Aron ........... G06F 1/329 713/400 |
| 2016/0087738 | A1 | 3/2016 | Jeon et al. |
| 2016/0294536 | A1* | 10/2016 | Biederman ........... H04L 5/0044 |
| 2017/0041897 | A1 | 2/2017 | Pitigoi-Aron et al. |

OTHER PUBLICATIONS

International Search Report and Written Opinion—PCT/US2018/040705—ISA/EPO—dated Oct. 24, 2018.

* cited by examiner

TECHNIQUES FOR SYNCHRONIZING SLAVE DEVICES

PRIORITY CLAIM

This application claims priority to and the benefit of U.S. Provisional Patent Application Ser. No. 62/532,553 filed in the U.S. Patent Office on Jul. 14, 2017, the entire content of this application being incorporated herein by reference as if fully set forth below in its entirety and for all applicable purposes.

TECHNICAL FIELD

The subject matter disclosed herein relates to electronic devices, and more particularly to methods, apparatus, and systems for synchronizing controllers and sensors.

BACKGROUND

Modern-day mobile devices contain many sensors. Usually, a data processing unit, controller, host device, or master device (hereinafter referred to as simply a controller or a host controller) is provided to receive and process data collected by sensors or slave units (hereinafter referred to a "sensor"). To conserve power, the controller is regularly placed into a sleep state when no data is being transferred from the sensors to the controller.

Two methods of transferring data from sensors to a controller are commonly utilized. In the first method, which is known as the asynchronous method, a sensor with available data to transfer notifies the controller by issuing a signal (e.g., a Data Ready Interrupt (DRI) signal through a dedicated DRI pin for certain known systems), which wakes up the controller, and then the sensor transfers the data when the controller is ready. In the second method, which is known as the synchronous method, the controller wakes up from the sleep state spontaneously at predetermined time intervals, polls the sensors, and receives from the sensors whatever data is present at the sensors. The synchronous method is more energy efficient in a device that includes multiple sensors because data transfers from more than one sensor may be consolidated into a single poll and transfer session.

In systems where multiple sensors or other devices provide periodically sampled data, it is further advantageous to be able to instruct the sensors to collect the data at essentially synchronized times, and for the controller to read the data from several sensors within the same awake time window or system awake period. Ideally, assuming a sensor delivers only the most current results, polling a sensor at a frequency that coincides with the sensor's sampling frequency is sufficient to obtain all of the data collected by the sensor. However, misalignment of the timing signals may result because the controller and the sensors do not usually share timing signals. Misalignment of the timing signals can cause some sensor data samples to be lost and/or cause some sensor data samples to be read twice even when the sensors are polled at their defined sampling frequencies. Misalignment may be exacerbated because some sensors have poor clock or timer accuracy (e.g., ±15% deviation over a temperature range and from device to device). Moreover, many sensors have limited processing capabilities that can be used to calibrate clocks and timers.

SUMMARY

According to an aspect of the disclosure, a method for calculating sensor timing corrections implemented with a sensor slave device is disclosed. The method includes determining a synchronization period as a number of cycles of an internal clock counted while a configured number of samples is captured in a slave device, receive information defining an offset from a time of an observed occurrence of a hardware synchronization event on a communication link, the offset being received in a command from a master device, adjusting the time interval between samples based on the hardware synchronization event and the offset by iterative digital approximation while concurrently calculating a watermark time corresponding to a sample start time configured by the master device for one or more slave devices.

In one aspect, adjusting the time interval between samples includes subtracting a multiple of the offset in tranches, each tranche being right-shifted a number of times based on the value of bits in a binary representation of the offset.

In one aspect, the sample start time is determined based on the hardware synchronization event and the offset. The hardware synchronization event may be a Sync Tick. The offset may include a Delay Time. The information defining the offset may include a resolution ratio used to calculate resolution of steps used to adjust the time interval between samples.

In certain aspects, adjusting the time interval includes receiving a current time interval and an old time interval at a synchronization circuit, and repeating until a difference between the current time interval and the old time interval is less than a desired maximum difference: right-shifting a binary representation of the current time interval to obtain a difference value; subtracting the difference value from the current time interval to obtain a new time interval when the current time interval is greater than the old time interval; adding the difference value to the current time interval to obtain the new time interval when the current time interval is less than the old time interval; storing the current time interval as the old time interval; and storing the new time interval as the current time interval. Calculating the watermark time may include receiving a watermark time at the synchronization circuit, and repeating until the difference between the current time interval and the old time interval is less than the desired maximum difference: right-shifting a binary representation of the watermark time to obtain a watermark difference; subtracting the watermark difference from the watermark time when the current time interval is greater than the old time interval; and adding the watermark difference to the watermark time when the current time interval is less than the old time interval.

According to an aspect of the disclosure, an apparatus includes a communications transceiver coupled to a serial bus, and combinational logic. The combinational logic may be configured to determine a synchronization period as a number of cycles of an internal clock counted while a configured number of samples is captured in a slave device, receive information defining an offset from a time of an observed occurrence of a hardware synchronization event on a communication link, the offset being received in a command from a master device and, at the slave device adjust the synchronization period based on the hardware synchronization event and the offset by iterative digital approximation while concurrently calculating a watermark time corresponding to a sample start time configured by the master device for one or more slave devices.

In another aspect, the combinational logic includes a shift register and subtraction logic. The shift register and the subtraction logic may be configured to adjust the synchronization period by subtracting a multiple of the offset in tranches, each tranche being right-shifted a number of times based on the value of bits in a binary representation of the offset.

In another aspect, the sample start time may be determined based on the hardware synchronization event and the offset. The hardware synchronization event may include a Sync Tick. The offset may include a Delay Time. The information defining the offset may include a resolution ratio used to calculate resolution of steps used to adjust the time interval between samples.

In another aspect, the combinational logic includes one or more shift registers, an adder and a subtractor configured to adjust the synchronization period by receiving a current time interval and an old time interval at a synchronization circuit, and repeating until a difference between the current time interval and the old time interval is less than a desired maximum difference: right-shifting a binary representation of the current time interval to obtain a difference value; subtracting the difference value from the current time interval to obtain a new time interval when the current time interval is greater than the old time interval; adding the difference value to the current time interval to obtain the new time interval when the current time interval is less than the old time interval; storing the current time interval as the old time interval; and storing the new time interval as the current time interval. The combinational logic may be configured to calculate the watermark time by receiving a watermark time at the synchronization circuit, and repeating until the difference between the current time interval and the old time interval is less than the desired maximum difference: right-shifting a binary representation of the watermark time to obtain a watermark difference; subtracting the watermark difference from the watermark time when the current time interval is greater than the old time interval; and adding the watermark difference to the watermark time when the current time interval is less than the old time interval.

According to an aspect of the disclosure, an apparatus includes means for determining a synchronization period as a number of cycles of an internal clock counted while a configured number of samples is captured in a slave device, means for receiving information defining an offset from a time of an observed occurrence of a hardware synchronization event on a communication link, the offset being received in a command from a master device, and means for adjusting the time interval between samples based on the hardware synchronization event and the offset by iterative digital approximation while concurrently calculating a watermark time corresponding to a sample start time configured by the master device for one or more slave devices.

In another aspect, the means for adjusting the time interval is configured to subtract a multiple of the offset in tranches, each tranche being right-shifted a number of times based on the value of bits in a binary representation of the offset.

In another aspect, the sample start time is determined based on the hardware synchronization event and the offset. The hardware synchronization event may include a Sync Tick and the offset may include a Delay Time. The information defining the offset may include a resolution ratio used to calculate resolution of steps used to adjust the time interval between samples.

In another aspect, the means for adjusting the time interval is configured to receive a current time interval and an old time interval at a synchronization circuit, and repeat until a difference between the current time interval and the old time interval is less than a desired maximum difference: right-shift a binary representation of the current time interval to obtain a difference value; subtract the difference value from the current time interval to obtain a new time interval when the current time interval is greater than the old time interval; add the difference value to the current time interval to obtain the new time interval when the current time interval is less than the old time interval; store the current time interval as the old time interval; and store the new time interval as the current time interval. The means for adjusting the time interval may be configured to receive a watermark time at the synchronization circuit, and repeat until the difference between the current time interval and the old time interval is less than the desired maximum difference: right-shift a binary representation of the watermark time to obtain a watermark difference; subtract the watermark difference from the watermark time when the current time interval is greater than the old time interval; and add the watermark difference to the watermark time when the current time interval is less than the old time interval.

According to an aspect of the disclosure, a processor-readable storage medium has code stored thereon that, when executed by a processor, causes the processor to determine a synchronization period as a number of cycles of an internal clock counted while a configured number of samples is captured in a slave device, receive information defining an offset from a time of an observed occurrence of a hardware synchronization event on a communication link, the offset being received in a command from a master device, and adjust the time interval between samples based on the hardware synchronization event and the offset by iterative digital approximation while concurrently calculating a watermark time corresponding to a sample start time configured by the master device for one or more slave devices.

In another aspect, the code causes the processor to adjust the time interval between samples by subtracting a multiple of the offset in tranches, each tranche being right-shifted a number of times based on the value of bits in a binary representation of the offset.

In another aspect, the sample start time is determined based on the hardware synchronization event and the offset. The hardware synchronization event may include a Sync Tick and the offset may include a Delay Time. The information defining the offset may include a resolution ratio used to calculate resolution of steps used to adjust the time interval between samples.

In another aspect, the code causes the processor to adjust the time interval by receiving a current time interval and an old time interval at a synchronization circuit, and repeating until a difference between the current time interval and the old time interval is less than a desired maximum difference: right-shifting a binary representation of the current time interval to obtain a difference value; subtracting the difference value from the current time interval to obtain a new time interval when the current time interval is greater than the old time interval; adding the difference value to the current time interval to obtain the new time interval when the current time interval is less than the old time interval; storing the current time interval as the old time interval; and storing the new time interval as the current time interval. The code may cause the processor to calculate the watermark time by receiving a watermark time at the synchronization circuit, and repeating until the difference between the current time interval and the old time interval is less than the desired maximum difference: right-shifting a binary representation of the watermark time to obtain a watermark difference; subtracting the watermark difference from the watermark time when the current time interval is greater than the old time interval; and adding the watermark difference to the watermark time when the current time interval is less than the old time interval.

DETAILED DESCRIPTION

Certain aspects of the disclosed methods and apparatus disclosed in the following description and related drawings are directed to specific embodiments presented as examples for illustrative purposes. Alternate embodiments may be devised without departing from the scope of the present disclosure. Additionally, well known elements may not be described in detail or may be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Example of an Apparatus with Multiple Sensors and/or Peripherals

Figure 1:
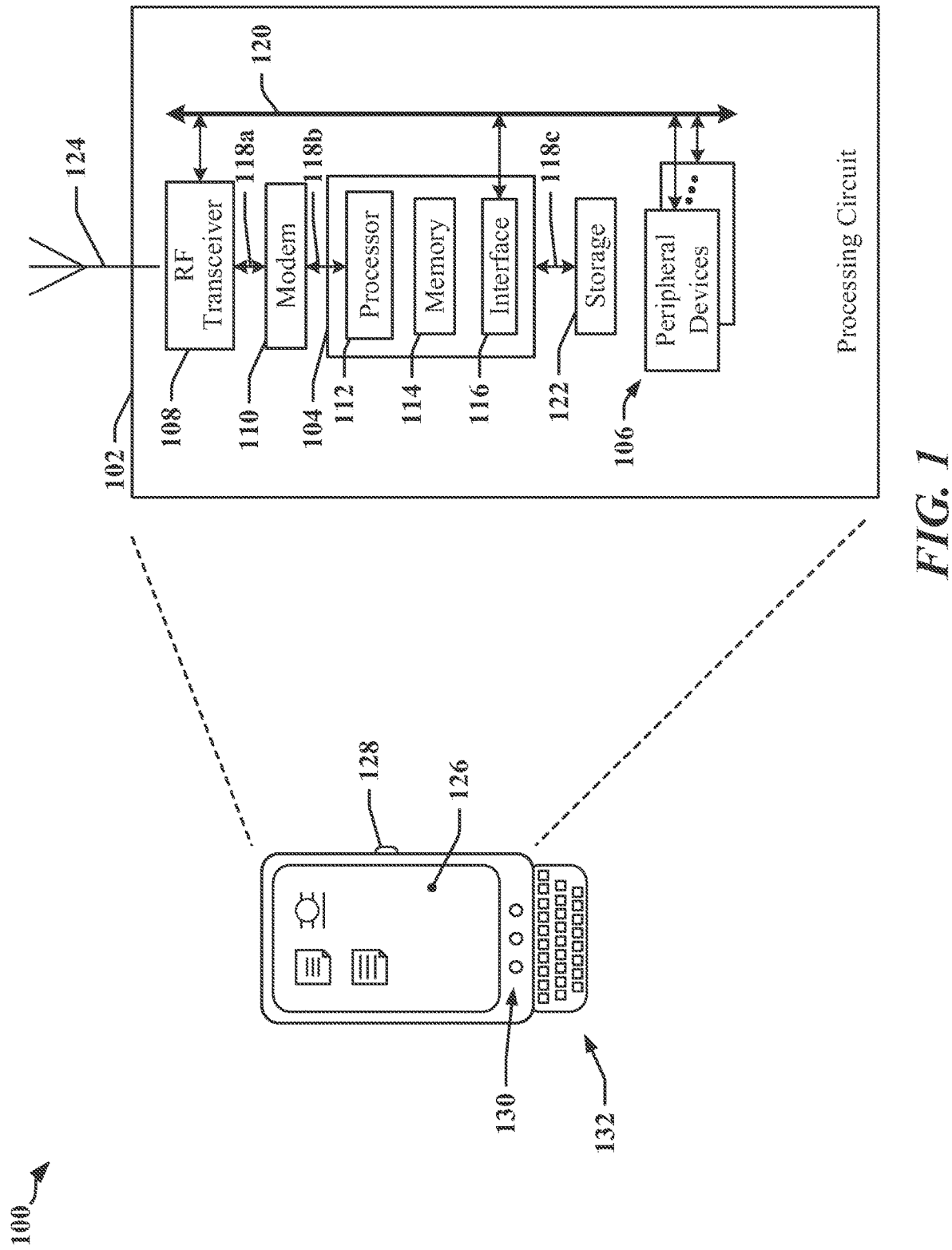
FIG. 1 illustrates an apparatus employing a data link between IC devices that is selectively operated according to one of plurality of available standards.

FIG. 1 illustrates an example of an apparatus 100 that may manage or support multiple peripherals and/or sensors coupled by a data communication bus. The apparatus 100 may include a processing circuit 102 having multiple circuits and/or other devices 104, 106, 108 and/or 110, including certain devices 104 that may include or support one or more sensors. The processing circuit 102 and/or the devices 104 may be implemented in one or more ASICs, and/or one or more SoCs. In one example, the apparatus 100 may be a communication device and the processing circuit 102 may include an ASIC 104 that functions as a host or application processor. The apparatus 100 may include one or more peripheral devices 106, one or more modems 110 and a transceiver 108 that enables the apparatus to communicate through an antenna 124 with a radio access network, a core access network, the Internet and/or another network. The configuration and location of the circuits or devices 104, 106, 108, 110 may vary between applications.

The circuits or devices 104, 106, 108, 110 may include a combination of sub-components. In one example, the ASIC 104 may include one or more processors 112, on-board memory 114, a bus interface circuit 116 and/or other logic circuits or functions. The processing circuit 102 may be controlled by an operating system that provides an application programming interface (API) layer to enable the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 118c, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
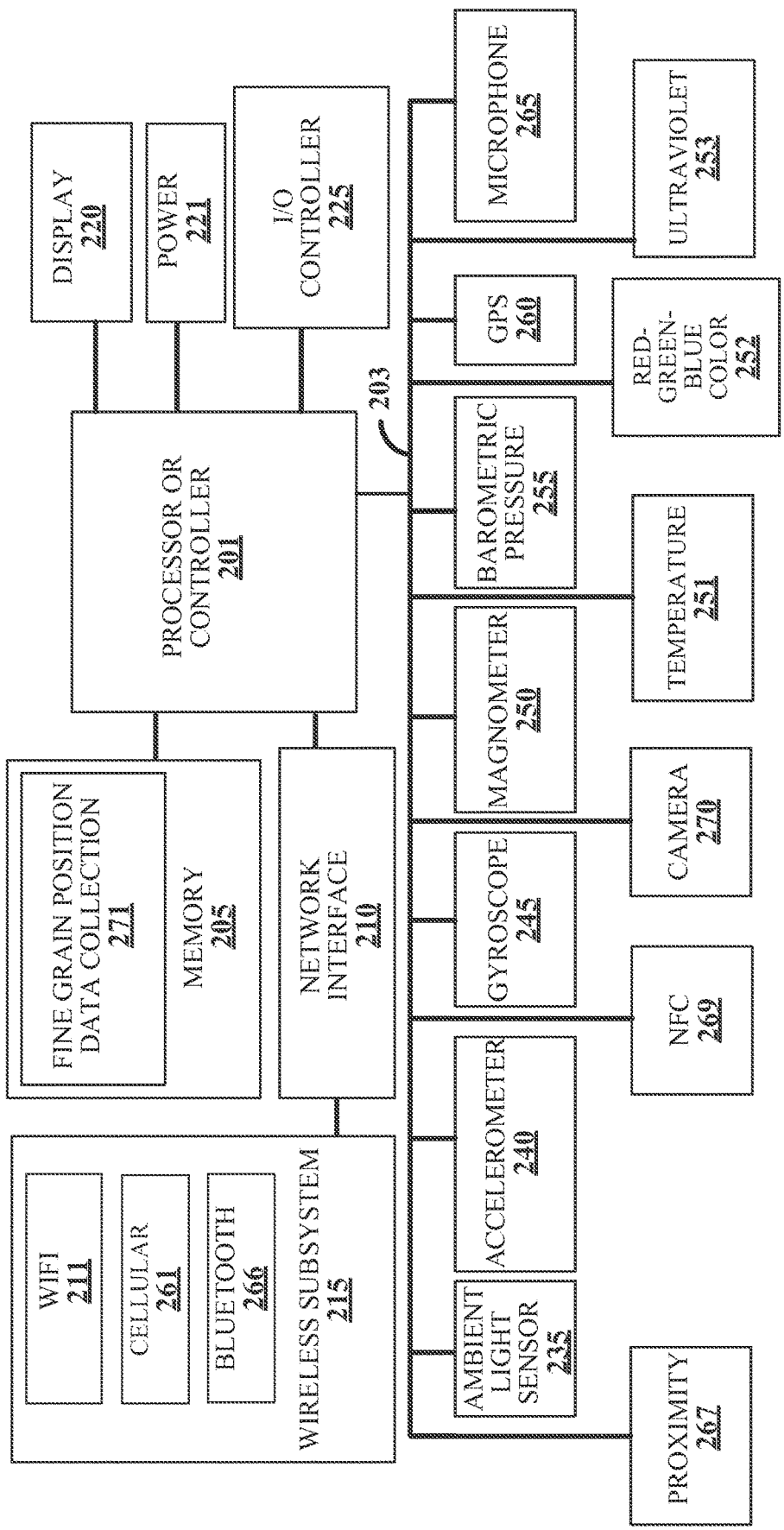
FIG. 2 is block diagram illustrating an exemplary mobile device in which the presently disclosed methods and apparatus may be implemented.

FIG. 2 is block diagram illustrating certain features of an apparatus 200 that can be adapted in accordance with certain aspects disclosed herein. The apparatus 200 may include one or more processors 201, a memory or storage device 205, I/O controller 225, and network interface 210. The apparatus 200 may also include a number of sensor devices coupled to one or more buses or signal lines further coupled to the processor 201. The apparatus 200 may also include a display 220, a user interface (e.g., keyboard, touch-screen, or similar devices), a power device 221 (e.g., a battery), as well as other components typically associated with electronic devices. In some embodiments, the apparatus 200 may be a mobile or non-mobile device. Herein "processor," "controller" and "data processing unit" are used interchangeably.

The apparatus 200 may include sensors such as ambient light sensor (ALS) 235, accelerometer 240, gyroscope 245, magnetometer 250, temperature sensor 251, barometric pressure sensor 255, red-green-blue (RGB) color sensor 252, ultra-violet (UV) sensor 253, UV-A sensor, UV-B sensor, compass, proximity sensor 267, near field communication (NFC) 269, and/or Global Positioning Sensor (GPS) 260. Multiple cameras may be integrated or accessible to a device. For example, a mobile device may have at least a front and rear mounted camera. The apparatus 200 may include multiples of other types of sensor.

The memory or storage device 205 may be coupled to the processor 201 and may store instructions for execution by processor 201. The memory or storage device 205 may be non-transitory. The memory or storage device 205 may also store one or more models or modules to implement certain functions and/or processes disclosed herein. The memory or storage device 205 may also store data from integrated or external sensors.

The network interface 210 may be coupled to a number of radio frequency (RF) subsystems 215 that include interfaces configured to transmit and receive data streams through a radio link to/from a radio access network. In various examples, the interfaces may include a Bluetooth interface 266, a WiFi interface 211, a cellular telephone network interface 261, and/or interfaces that can couple the apparatus 200 to other types of network. The network interface 210 may include a wired interface for direct connection to networks such as the Internet, Ethernet, or other wired networks. The apparatus 200 may include one or more local area network transceivers connected to one or more antennas (not shown). The local area network transceiver includes suitable devices, hardware, and/or software for communicating with and/or detecting signals to/from RF APs, and/or directly with other RF devices within a network. In one example, the local area network transceiver may include a WiFi (IEEE 802.11x) communication system suitable for communicating with one or more RF access points.

The apparatus 200 may also include one or more wide area network transceivers that can be connected to one or more antennas. The wide area network transceiver includes suitable devices, hardware, and/or software for communicating with and/or detecting signals to/from other RF devices within a network. In one example, the wide area network transceiver may include a CDMA communication system suitable for communicating with a CDMA network of RF base stations. In other examples, the RF communication system may include another type of cellular telephony network or femtocells, such as, for example, TDMA, 4G LTE, LTE Advanced, WCDMA, UMTS, 5G, or GSM. Additionally, any other type of networking technologies may be used, for example, WiMax (802.16), Ultra-Wide Band, ZigBee, etc.

The apparatus 200 may be implemented in a mobile device, a communication device, a cell phone, a personal digital assistant, a mobile computer, a wearable device (e.g., watch, head mounted display, virtual reality glasses, etc.), a robot navigation system, a tablet, a drone, a multicopter, a personal computer, a laptop computer, an appliance, or any type of device that has processing and/or communication capabilities. As used herein, a mobile device may be any portable, or movable device or machine that is configurable to acquire RF signals transmitted from, and transmit RF signals to, one or more wireless communication devices or networks. Thus, by way of example, but not limitation, the apparatus 200 may include a radio device, a cellular telephone device, a computing device, a personal communication system device, or other like movable RF communication equipped device, appliance, or machine. Any operable combination of the above are also considered a "mobile device." The apparatus 200 may be implemented or included in a device that is substantially stationary or situated at a fixed location. In various examples, the apparatus 200 may be implemented in a computer, an appliance, network infrastructure, entertainment systems including televisions, surveillance and security systems including cameras and sensors, industrial equipment including devices and systems that operate, manage, and/or control assembly line equipment, including robotic devices and the like.

The apparatus 200 may communicate with a plurality of RF access points (APs), NodeBs, eNodeB's, base stations, etc. using RF signals (e.g., 2.4 GHz, 3.6 GHz, and 4.9/5.0 GHz bands) and standardized protocols for the modulation of the RF signals and the exchanging of information packets (e.g., IEEE 802.11x).

Certain examples described herein may be implemented through the execution of instructions, such as instructions stored in the memory or storage device 205 or other element, by processor 201 of the apparatus 200 and/or other circuitry of the apparatus 200. Particularly, circuitry of the apparatus 200, including but not limited to processor 201, may operate under the control of a program, routine, or the execution of instructions to execute methods or processes in accordance with embodiments of the invention. For example, such a program may be implemented in firmware or software (e.g. stored in memory or storage device 205 and/or other locations) and may be implemented by processors, such as processor 201, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Certain of the functions, engines or modules described herein may be performed by device itself and/or some or all of the functions, engines or modules described herein may be performed by another system connected through the I/O controller 225 or the network interface 210. Thus, some and/or all of the functions may be performed by another system and the results or intermediate calculations may be transferred back to the apparatus 200. In some embodiments, such other devices may include a server configured to process information in real time or near real time. In some embodiments, the other device is configured to predetermine the results, for example based on a known configuration of the device. Further, one or more of the elements illustrated in FIG. 2 may be omitted from the apparatus 200. For example, one or more of the sensors 230-165 may be omitted in some embodiments.

Synchronization of Slave Devices

Figure 3:
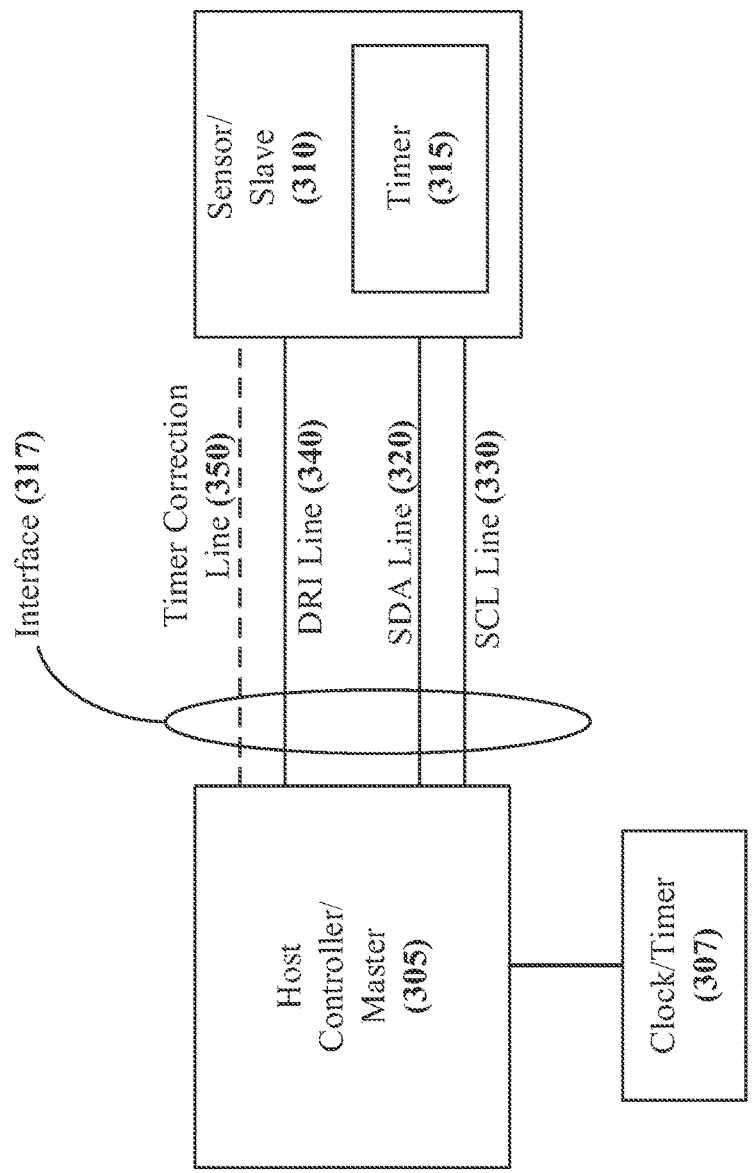
FIG. 3 is block diagram illustrating an exemplary hardware environment in which the presently disclosed methods and apparatus may be implemented.

FIG. 3 is block diagram illustrating a hardware environment 300 which may be adapted in accordance with certain aspects of the present disclosure. A host controller 305 (or master) may be provided to receive and process data samples transferred from a sensor 310 (or any other device that provides sampled data to a host or master), among other functions. In an example, the host controller 305 may be implemented by or within the processor 201 of the apparatus 200, but is not limited to such and may be implemented separate from processor 201. The sensor 310 may be a sensor of any type, such as those described above, or any device that collects and sends sampled data. Any number and type of sensor may be present. In some examples, the host controller 305 may be provided with a clock or timer signal generated by a clock circuit 307. In other embodiments, an internal clock generator may be embedded with the host controller 305. The sensor 310 includes an internal timer 315 in the sensor 310, which may include a clock generator and/or other circuits that generate a timer signal for timing the collection and transmission of samples by the sensor 310. A data connection, bus, or interface 317 links the processor 201 with the sensor 310 and allows for, among other things, timing of the transfer of data between the host controller 305 and the sensor 310. In the example shown in FIG. 3, the data connection may be an Inter IC bus (I²C bus) or an I3C bus including a Serial Data (SDA) line 320 and a Serial Clock (SCL) line 330. Both SDA line 320 and SCL line 330 may be pulled up with pull-up resistors (not shown). The operation of I²C or I3C busses are known in the art, and will not to be described in detail here for sake of brevity.

The data connection may be implemented using a universal asynchronous receiver/transmitter (UART) connection, a Serial Peripheral Interface (SPI) bus, a System Management Bus (SMBus), a Serial Low-power Inter-chip Media Bus (SLIMbus™), a SoundWire bus, an RF interface. In some embodiments, the sensor 310 may have a Data Ready Interrupt (DRI) pin, which may be connected to the host controller 305 via a DRI line 340. In embodiments where more than one sensors are present, DRI lines from the multiple sensors may be multiplexed before being connected to processor 201. In some other embodiments, in addition to or instead of a DRI pin, the sensor 310 may have a dedicated clock correction pin, which may be connected to the processor 201 via a timer correction line 350.

The apparatus 200 may include and/or be coupled to a sensor 310 and the host controller 305. The sensor 310 may have a timer 315 in the sensor 310 and the host controller 305 may have or be coupled to a clock circuit 307. The clock circuit 307 may generate or recover clock signals and may include one or more timers. For example, the clock circuit 307 may include timers used by the host controller 305 to correct the timer 315 in the sensor 310 for a first time and correct the timer 315 in the sensor 310 for a second time after transferring data from the sensor 310. A time interval between two corrections of the timer 315 in the sensor 310 may be selected such that the timer 315 in the sensor 310 is sufficiently aligned with the clock circuit 307 in the host controller 305 over the time interval.

Two methods of transferring data from the sensor 310 to the host controller 305 are commonly utilized. In the first method, also known as the asynchronous method, a sensor 310 with available data to transfer may notify the host controller 305 by issuing a Data Ready Interrupt (DRI) signal through a dedicated DRI pin, which wakes the processor up from the sleep state, and transfers the data when the processor is ready for the data transfer. In the second method, also known as the synchronous method, the host controller 305 may wake up from the sleep state spontaneously at predetermined time intervals, and may poll the sensor 310 to receive data. The synchronous method is more energy efficient in a device that has or supports multiple sensors because data transfers from more than one sensor may be consolidated into a single poll and transfer session.

A sensor 310 may be polled at a frequency that coincides with the sensor's sampling frequency. When the sensor 310 delivers only the most current result, this type of polling may be sufficient to obtain all data samples collected by the sensor 310. However, the host controller 305 and the sensor 310 do not usually share a clock or timing signal and misalignment of the timing of respective clock circuits 307 and timers 315 may occur, and some sensor data samples may be lost or read more than once when the sensor 310 is polled at its sampling frequency. The phenomenon may be exacerbated by the fact that some sensors may have very poor timer accuracy (i.e., ±15% deviation over the temperature range and from device to device). Misalignment may be exacerbated because some sensors have poor clock or timer accuracy (e.g., ±15% deviation over a temperature range and from device to device).

Figure 4:
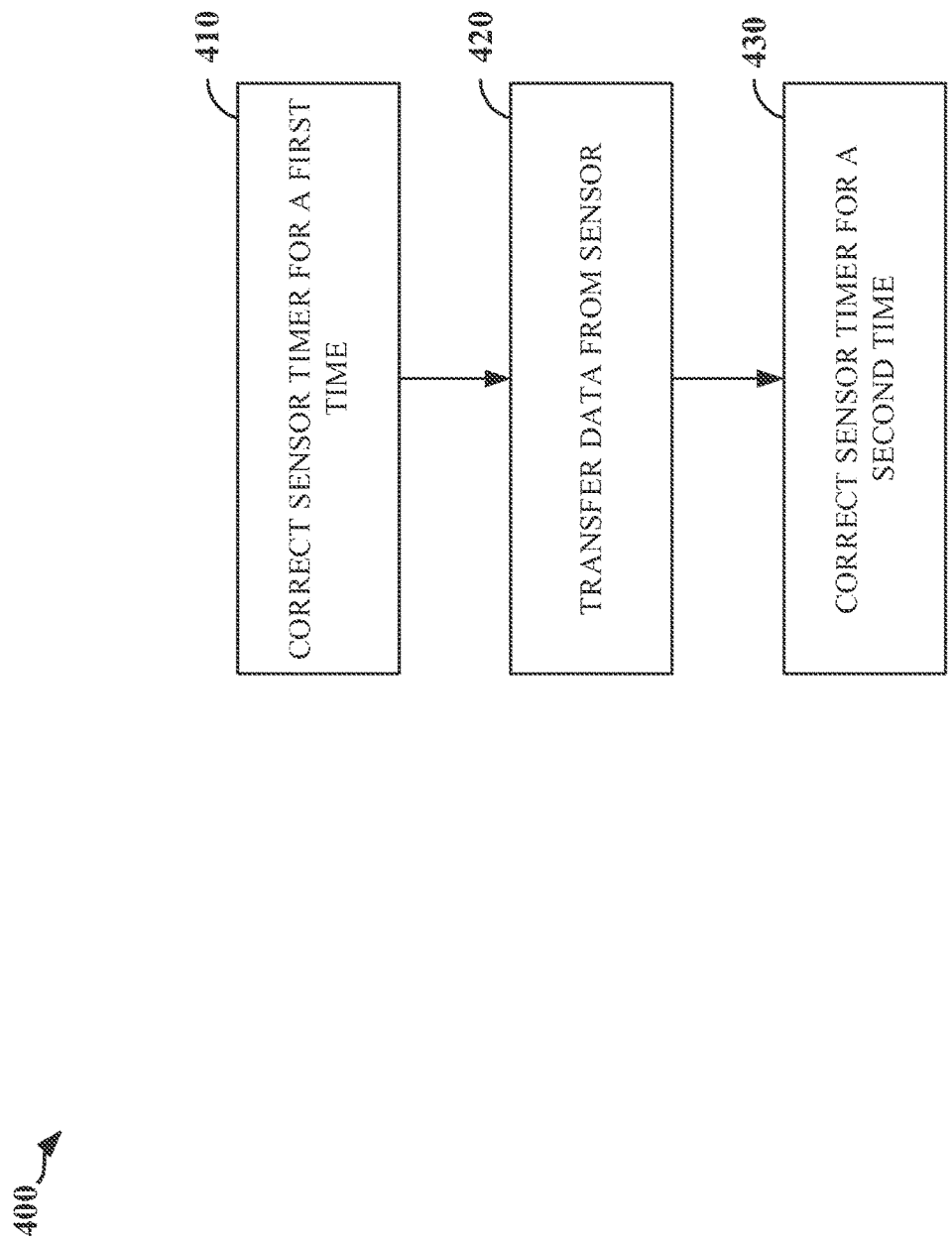
FIG. 4 is a flowchart illustrating an exemplary method for synchronizing a host controller and sensor timers.

FIG. 4 includes a flowchart 400 illustrating an example of a method for synchronizing sensor timing. At block 410, the timer 315 in the sensor 310 may be corrected for a first time. Correcting the timer 315 in the sensor 310 may include applying a timer correction factor to the timer 315 in the sensor 310 on which the sampling events are based, such that the timer 315 in the sensor 310 is sufficiently aligned with the clock signal used by the clock circuit 307 in the host controller 305. The timer 315 in the sensor 310 may be sufficiently aligned with the processor clock signal used to control polling events when it can be guaranteed for a sufficiently long period of time that polling the sensor 310 at a frequency that coincides with the sensor's specified sampling frequency will result in receiving all sensor data samples, with no data sample being lost and no data sample being read twice. The ratio between the actual frequencies of two perfectly aligned timing signals is equal to the ratio between the specified frequencies of the two timing signals. At block 420, the sensor 310 may be polled by host controller 305, and sensor data samples may be transferred to the host controller 305 from the sensor 310. Multiple polls and multiple data sample transfers may be conducted at block 420. At block 430, the sensor clock may be corrected for a second time in the same way it is corrected for the first time in block 410. The time interval between two corrections of the timer 315 in the sensor 310 may be selected such that the timer signals remain sufficiently aligned over the time interval, including when inaccuracies of timer signals are accumulated over the time interval. If the selected time interval is too short, energy may be wasted in correcting sensor timers 315 more often than needed. On the other hand, if the interval selected is too long, timer signals may become misaligned and data sample loss or repetition of data sample transfers may occur.

The time interval between two sensor timer corrections may be referred to as the Phase Time or Time Phase interval (T_Ph). In particular, the Time Phase interval (T_Ph) may be a period of time provided by a master or host controller 305 that indicates a pre-established time duration that is used by slaves (the sensor 310) for adjusting their internal timers and the beginning of a sequence of sampling events. The "T" stands for "time" or "period" and "Ph" for "phase", denoting that the sequence of sampling events takes place within the same time period and begins at the same moment. In certain examples, T_Ph may be expressed as a preconfigured or predefined number of samples or sampling events in the sequence of sampling events over a T_Ph period. In one example, the T_Ph may be expressed as 20 sampling events that occur in each T_Ph period.

The internal timer 315 in the sensor 310 may be kept sufficiently aligned with the host controller clock when blocks 410 through 430 are performed repeatedly. In some examples, T_Ph may be a common multiple of the sampling periods associated with active or installed sensors. In an example where three sensors having sampling frequencies of 200 Hz, 100 Hz, and 10 Hz (corresponding to sampling periods of 5 ms, 10 ms, and 100 ms), respectively, are present, 100 ms may be selected as the T_Ph. Synchronizing a plurality of sensors substantially simultaneously using a T_Ph that is a common multiple of sampling periods can align the sensor clock signals with each other and allow the processor to obtain all samples with the fewest wake windows in synchronous mode of operation. For example, when the sensor clocks of the three sensors with sampling frequencies of 200 Hz, 100 Hz, and 10 Hz are not mutually aligned, the processor may have to wake up a total of 410 times per second to obtain all samples in the worst case scenario, where the processor receives a single sample from a single sensor in each wake window (200 times per second for the 200 Hz sensor, 100 times per second for the 100 Hz sensor, and 10 times per second for the 10 Hz sensor). On the other hand, if the sensor timers of the three sensors are aligned, the processor needs to wake up only 200 times every second to obtain all samples: the 200 Hz sensor is polled every time the processor wakes up; the 100 Hz sensor is polled every other time the processor wakes up; and the 10 Hz sensor is polled every 20 times the processor wakes up. Reducing the number of wake windows required can conserve power and extend battery life. In some examples, T_Ph may be set to be approximately 1 second. T_Ph may also be adjusted at run-time in embodiments where clock-related feedback information is provided by the sensor 310.

Various methods for correcting the timer 315 in the sensor 310 may be employed. In some examples, the sensor 310 may receive information relating to the clock circuit 307, derive and apply a corresponding correction factor. In some examples, the sensor 310 may send information relating to its internal timer 315 to the host controller 305, receive the timer correction factor derived at the host controller 305, and apply the timer correction factor.

Timer-related information may be exchanged between the host controller 305 and the sensor 310 in a variety of manners. In some examples, the clock or timer information may be transferred using the DRI line 340. In other examples, the clock or timer information may be transferred using a dedicated clock or timer correction line 350. In yet some other examples, the clock or timer information may be transferred using a data communication link provided between the processor 201 and sensor 310, such as an I$^2$C or I3C bus or another serial multi-drop bus.

In one example, the sensor 310 may receive information relating to the clock circuit 307, derive the timer correction factor, and apply the timer correction factor when the timer 315 in the sensor 310 is being corrected. The host controller 305 may transmit a burst of pulses consisting of a predetermined number of pulses to sensor 310 when the timer 315 in the sensor 310 is being corrected. The burst of pulses may be derived from the host controller clock circuit 307 and its frequency may be dependent on that of the host controller clock circuit 307. The burst may last for a relatively short period of time. Here, the sensor 310 may be configured a priori with the expected frequency of the burst. Once the sensor 310 receives the burst, it may compare the frequency of the burst received with the expected frequency, derive a timer correction factor accordingly, and apply the timer correction factor to correct the internal timer 315 in the sensor 310.

In another example, the host controller 305 may transmit two pulses to the sensor 310, where the pulses are spaced by a predetermined time interval as measured by the processor timer when the timer 315 in the sensor 310 is being corrected. The time interval may be selected such that it can be reliably used to derive a timer correction factor to correct the timer 315 in the sensor 310. This time interval may be referred to as the Frequency Time interval (T_Fq). T_Fq may be in the range of a few milliseconds. In some instances, T_Fq is selected to coincide with the shortest sensor sampling period present. In some instances, T_Fq may be chosen to be as long as T_Ph. For example, T_Fq may be 1 second. Here, the sensor 310 may be configured a priori with the predetermined T_Fq. Once the sensor 310 receives the two pulses, it may compare the duration of the time interval bookended by the two pulses received, as measured by the sensor timer, with the predetermined T_Fq, also as measured by the sensor timer, derive a timer correction factor accordingly, and apply the timer correction factor to correct the internal sensor timer.

In another example, the sensor timer may be corrected by causing the host controller 305 to transmit timer correction messages to the sensor 310 over the data connection between the host controller 305 and the sensor 310 such that two identifiable significant edges generated during a transmission of timer correction messages are spaced by a predetermined T_Fq, as measured by the processor timer. The data connection between the host controller 305 and the sensor 310 may be an I$^2$C bus or I3C bus. It may also be a UART bus connection, an SPI bus, or any other type of connection suitable for transferring data between a controller and a sensor. The predetermined T_Fq may be the same as described above. Here, the sensor 310 may be configured a priori with the predetermined T_Fq. Once the sensor 310 receives the timer correction messages, it may compare the duration of the time interval bookended by the two identifiable significant edges included with the timer correction messages, as measured by the timer 315 in the sensor 310, with the predetermined T_Fq, also as measured by the sensor timer, derive a timer correction factor accordingly, and apply the timer correction factor to correct the internal sensor timer.

In an example where the data connection between the host controller 305 and sensor 310 is an I²C or I3C bus, two clock correction messages may be transmitted. These two timer correction messages may be referred to as MS1 and MS2, respectively. T_Fq may be bookended by the falling edge on the SDA line 320 in the START condition for MS1 and the falling edge on the SDA line 320 in the START condition for MS2, or may alternatively be bookended by the rising edge on the SDA line 320 in the STOP condition for MS1 and the falling edge on the SDA line 320 in the START condition for MS2. When T_Fq is chosen to be as long as T_Ph, only one timer correction message, e.g., MS1, may be required, and the MS1 message may be transmitted by the processor 201, for example, at the beginning of each T_Ph. Thus, the time period T_Fq that is equal to T_Ph may be bookended by, for example, the falling edges on the SDA line 320 in the START condition for two consecutive MS1 messages. Other examples use different variations and parameters. Moreover, the use of a serial bus such as the I²C or I3C bus to facilitate correction of the timer 315 in the sensor 310 also allows for supplementary error correction procedures, fault detections, and abort commands, etc. For example, the sensor 310 may transmit a timestamp or a message including time deviation information and the host controller 305 may correct the subsequent streams of data accordingly. By utilizing this procedure, the accuracy requirements of T_Ph may be relaxed. Other ways of exploiting the bi-directional communication abilities of the I²C or I3C bus for timer correction purposes have also been contemplated.

In one example of other techniques for correcting the timer 315 in the sensor 310, the sensor 310 may send information relating to its internal timer 315 in the sensor 310 to the host controller 305, receive the timer correction factor derived at the host controller 305, and apply the timer correction factor when the timer 315 in the sensor 310 is being corrected.

In some examples, the sensor 310 may transmit two pulses spaced by a predetermined T_Fq or Output Data Rate (ODR) period as measured by the sensor timer to the host controller 305 when the timer 315 in the sensor 310 is being corrected. The predetermined T_Fq may be the same as described above. Here, the host controller 305 may be configured a priori with the predetermined T_Fq. When the host controller 305 receives the two pulses, it may compare the duration of the time interval bookended by the two pulses received, as measured by the processor timer, with the predetermined T_Fq, also as measured by the processor timer, derive a timer correction factor accordingly, and transmit the timer correction factor to the sensor 310 via the interface 317 between the host controller 305 and the sensor 310, such as an I²C or I3C bus. the sensor 310 then may receive the timer correction factor and apply it.

Other techniques for correcting the timer 315 in the sensor 310 may be implemented without the use of a timer correction factor. In various examples, the clock circuit 307 may provide a signal or other information to the sensor 310, and the sensor 310 may base the sampling events directly on the signal or information provided by the clock circuit 307. The signal or information provided by the clock circuit 307 may be transmitted using a dedicated line, the DRI line 340, or may be transmitted within messages transferred on the data connection between the processor 201 and the sensor 310.

In one example, the host controller 305 may generate a sampling timer signal using the clock circuit 307, and may transmit the sampling timer signal to the sensor 310. The frequency of the sampling timer signal may be the same as the sampling frequency of the sensor 310. The sensor 310 may be configured to ignore its internal timer 315 in the sensor 310 and collect a sample only when it encounters a pulse in the sampling timer signal transmitted by the host controller 305.

In an example where multiple sensors are present, the frequency of the sampling timer signal generated by the host controller 305 may be selected such that the frequency of the sampling timer signal is a common multiple of sampling frequencies of sensors present. For example, for an embodiment where three sensors having sampling frequencies of 200 Hz, 100 Hz, and 10 Hz, respectively, are present, processor 201 may generate a sampling timer signal with a frequency of 200 Hz based on the processor timer and transmit the sampling timer signal to all three sensors. Then, the sensor with the 200 Hz sampling frequency may be configured to collect a sample at every pulse it encounters in the sampling timer signal; the sensor with the 100 Hz sampling frequency may be configured to collect a sample at every other pulse it encounters in the sampling timer signal; and the sensor with the 10 Hz sampling frequency may be configured to collect a sample at every $20^{th}$ pulse it encounters in the sampling timer signal.

When sampling timing is based on the clock circuit 307 in the host controller 305, sampling events of the sensor 310 and polling events of the host controller 305 can be expected to always be aligned. The sampling timer signal may also serve as the polling signal. In another example, a signal or information generated by the clock circuit 307 may be directly provided to the sensor 310, and the sensor 310 may base the sampling events on the clock circuit 307 instead of its internal timer 315 in the sensor 310.

By utilizing the methods for synchronizing sensor timers described herein, a controller may coordinate timer corrections for sensors and receive all sensor data samples from multiple sensors in batches in an energy-efficient synchronous mode, without wasting energy in polling the sensors at a frequency that is higher than necessary. The frequency of re-synchronizing sensors may be determined by transmitting a single set of timer correction messages from the processor to the sensors, where the timer correction messages include one or more messages. The frequency of re-synchronizing sensors may be the multiplicative inverse or reciprocal of T_Ph.

Specific hardware and/or software events may be used as time-controlled synchronizing events. The specific hardware and/or software events may depend on the transport system or interface used, e.g., the event would differ between different bus interfaces such as I2C, I3C, RFFE, SPMI, etc. provided between controller/master devices and sensor/slave devices. The events may be identified with specific set of commands and data. In one example, such commands can be sent within the same bus transaction, for example, that is used for an otherwise normal data exchange, thereby limiting energy usage. Time synchronizing events may be sent by a host controller at T_Ph intervals. In one example, the time synchronizing event may be chosen from hardware events that are known to occur on a transport system or interface. In a particular aspect with respect to busses such as I²C or I3C, there are several start conditions (START) that are known to occur on an interface that may be used as time synchronizing events, although the hardware event is not limited to such. In an aspect, regardless of the transport system or interface, the hardware event may consist of a mutually identifiable message known to both the host controller and the sensors a priori. Thus, the sensors (and host controller) may identify the T_Ph intervals beginning when the mutually identifiable hardware event occurs on the transport system or interface.

In some systems, different sensors or other devices sample their data at different times. This may occur when setting a common sampling frequency because the timers or oscillators in the different sensor devices are typically not accurate enough to maintain synchronization and eventually drift apart. A synchronous time control mechanism or hardware event proposed in certain systems (e.g., an I$^2$C bus or an I3C bus system according to the MIPI I3C$^{SM}$ specification) provides a way for the controller to form a synchronization pulse or message, called a SYNC Tick (ST). This way, even with variances in sensor timers or oscillators, the sampling will be performed very close together in time, allowing for their preparation and activation of the sampling mechanism. Furthermore, the hardware event is mutually agreed upon by the host controller/master and sensor/slave, and is the event that is to be timestamped by the slave/sensor against its time base (i.e., its internal timer/counter). In other examples, the hardware event could be the start of the communication on the line, which for I$^2$C, I3C, or System Management Bus (SMBus), as examples, could be chosen as one of the transmission starts that will be the moment in time that is to be recorded/timestamped by the sensor/slave. For other interfaces, the hardware event may be some other mechanism. As an example, in SPI, the hardware event could be the CS line going LOW for the transmission. As another example, assuming a very fast interface with respect to the timing of a hardware event, the moment could be even the ST message itself, as in the case of SPI, where the message takes only one microsecond, and thus would adequate for synchronizing a 1 second long T_Ph.

In certain examples, the ST may be a message that is configured to validate, and identify which of the many similar hardware events occurring on an interface is the one that should be used for further calculation of the correct start of T_Ph. The hardware event may be one of any number of known events. As an example of a hardware event, the ST itself may constitute the agreed upon hardware event in an SPI transport, where the ST message only take 1 microsecond of time altogether, which would be sufficiently short for a synchronizing event. Other examples of hardware events may be edges of the pulses on the transport medium. Some hardware events may have a supplementary characteristic, such as being the last edge of a defined set of pulses. In RF communication systems, the starting of communications on the RF interface may constitute a hardware event. In another example for RF interfaces, the hardware events may be communicated and through the use of special or dedicated communications or communication channels particular to various known networking protocols. Additionally, a Delay Time (DT) may be provided as a validating and/or correcting message. With these three elements; i.e., the hardware event, the ST identifying message and the DT validating and/or correcting message, the presently disclosed synchronization procedure may be accomplished. And because the messages (e.g., a hardware event, an ST and a DT) can be sent some time after the correct start of T_Ph, the method covers all uncertainties of the whole system. For purposes of this disclosure, it is noted that the combination of the hardware event and the ST message identifying the hardware event may be referred to collectively as a "synchronization message." In certain aspects, the hardware event may be subsumed into the ST message where the starting edge or time of the ST message constitutes the hardware event.

Figure 5:
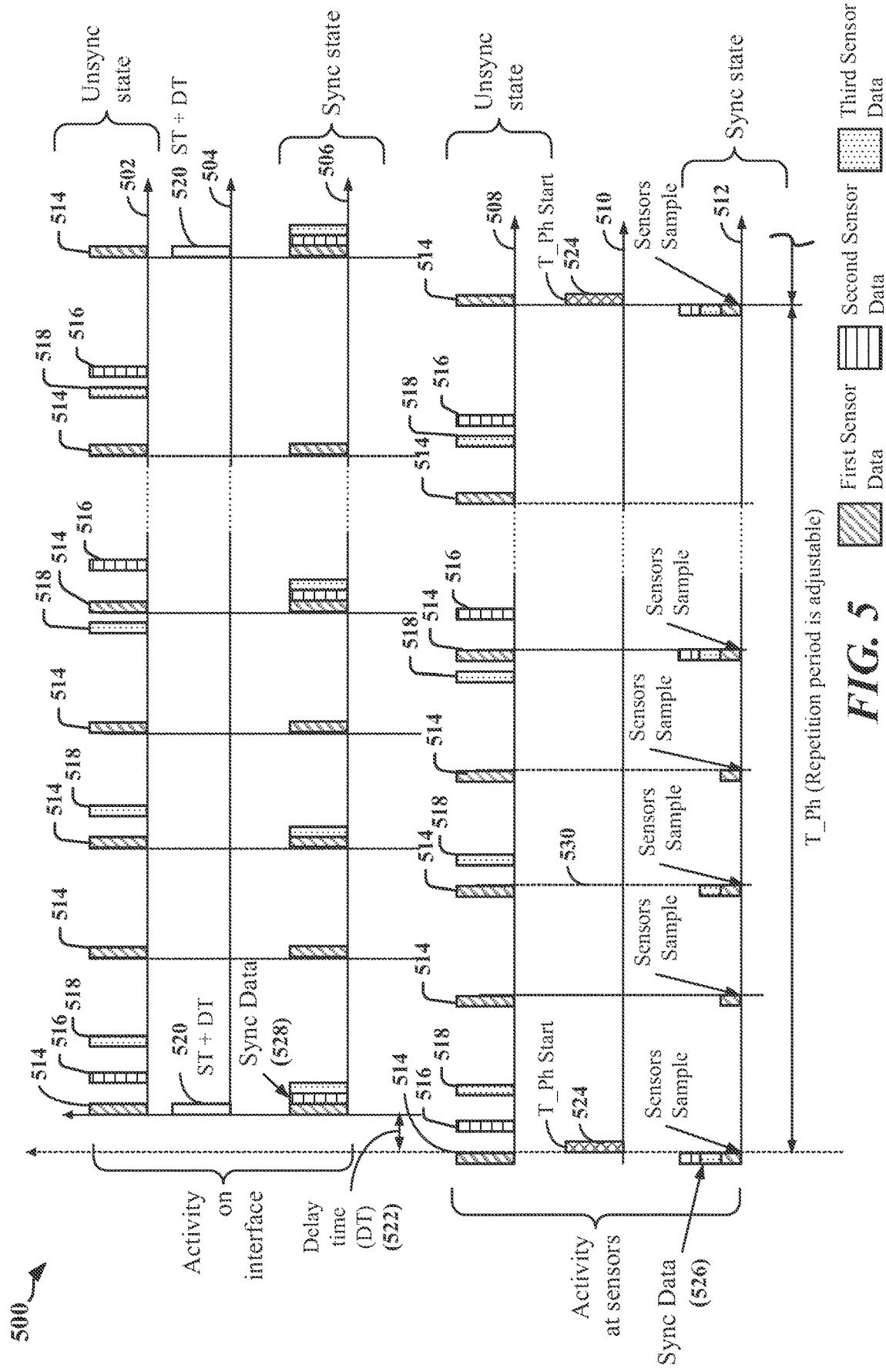
FIG. 5 illustrates an exemplary system timing diagram of activity on an interface.

FIG. 5 illustrates a system timing diagram 500 related to an example of activity on an interface, where the diagram shows a transition from unsynchronized or random sampling timing in a system to a synchronized timing state for sampling over T_Ph time periods. It is noted that the interface is not limited to a particular transport system, and may include wired busses or RF interfaces in other examples. In the example of FIG. 5 three sensors are illustrated, but th fewer or more sensors may be provided in the system and the concepts disclosed herein apply to one or more sensors. The top three timelines 502, 504, and 506 in FIG. 5 illustrate activity visible on an interface, such as an I$^2$C, I3C, SPI, etc. interface, and include commands sent by a host controller to the various sensors or other devices providing data samples on the interface and data samples from various sensors or other devices. The timelines 502, 504, and 506 also illustrate a change in time or states from the unsynchronized state (timeline 502) to the synchronized state (timeline 506). The bottom three timelines 508, 510, and 512 illustrate data availability inside the individual sensors (or other devices providing data). As with the timelines 502, 504, 506, timelines 508, 510, and 512 also illustrate a change in time or states from the unsynchronized state (timeline 508) to the synchronized state (timeline 512). It is noted that timeline 502 corresponds to a time before synchronization processes have been effectuated and timeline 506 corresponds to a time after synchronization processes are effectuated.

As may be seen in timeline 502, sensor data from the different sensors connected by the interface (i.e., data 514 for the first sensor, data 516 for the second sensor, and data 518 for the third sensor) is not synchronized since the data is sent at various and seemingly random times on the interface, with the sensors running at their own respective ODRs and unrelated timers. In certain aspects of this unsynchronized state, a host controller would awaken for each sensor's DRI events, which wastes a significant amount of system energy. Similarly, timeline 508 shows the unsynchronized state of the sensor data 514, 516, 518 at the various sensors.

Timeline 504 illustrates that the host controller may transmit information signals or information messages 520 as the time synchronization event, which are sent at the start of each T_Ph period to the various sensors coupled with the interface. According to an aspect, each of the information messages 520 may include a hardware event such as a synchronization edge, synchronization pulse, or synchronization message (i.e., the ST message), as well as a DT message, which will be discussed in more detail below. For purposes of this disclosure, the term "information message" 520 used herein connotes and may be referred to herein as a combined ST and DT message. The ST edge or message in the information message 520, although not shown in FIG. 5 as being separate from the information message 520, may occur at the start of the information message 520 and may be a distinct from the DT message, or may alternatively be configured such that the rising edge of information message 520 provides the ST messaging, with the remainder consisting of the DT information. The information message 520 can be used by the sensors to correct their timing; i.e., correct their timers for purposes of synchronization with the host controller.

In various aspects, the time period between the information messages 520 is selected to be the time phase period T_Ph. Due to hardware and software overhead, however, there may be a delay between the expected beginning of new T_Ph periods and the transmissions of information messages 520, and the delay may be referred to herein as the Delay Time (DT), which is illustrated in FIG. 5 at reference 522. To compensate for the potential inaccuracies that may result from unpredictable and variable starts of the T_Ph period (and the issuance of the ST edge or message), the DT period may be measured by the host controller, and this measured time period communicated by the host controller with as the DT portion of the information message 520. Furthermore, in an aspect, the DT portion of an information message 520 is transmitted after the transmission of the ST edge or message portion of the information message 520. In the example of an I3C interface, the information message 520 may be transmitted in-band, thus requiring only two lines (e.g., SDA and SCL). Furthermore, the DT message or command may be configured to provide the number of time units by which the START Condition has been delayed on a transport system or medium (e.g., an $I^2C$ or I3C Bus) relative to perfectly in-sync timing. The DT message may use one data byte, where the Most Significant Bit (MSB) of the data byte is a flag indicating whether overflow of a time delay counter has occurred. A value 1b'0, for example, would indicate no overflow. The lower 7 bits of the data byte may be configured to contain a valid timer value. A value 1b'1 in the MSB may indicate that an overflow has occurred and that the lower 7 bits of the data byte do not contain a valid value, and that the sensor or slave should abort the current Synchronization Procedure.

In one example, the DT is measured by the host controller with reference to the internal clock or timer of the host controller. In one example, the host controller may utilize a predetermined time (e.g., a "watermark"), or a coincidence time on its running timer, which corresponds to the perfect time for starting T_Ph (termed "Starting T_Ph time"). The host controller may then send a command to an interface controller for sending the ST message to the sensor or slave devices (e.g., transceiver 1112 shown in FIG. 11). This interface controller may then schedule the transmission, and may eventually start the transmission when the interface is available. The interface controller records the real-time moment (termed "Real T_Ph time") when the transmission started against the host controller time base. In one example, timing can be determined based on the same running timer that the host controller used for determining the watermark or coincidence time, or a derivative of such timer. Regardless, the two time information (i.e., the "Starting T_Ph time" and the "Real T_Ph time") are related and are based on the same time base, namely the host controller's time base. The host controller then calculates the difference between "Starting T_Ph time" and the "Real T_Ph time" and then expresses that difference in time units as previously agreed with the slave/sensor, formats the DT message, and sends it to the slave/sensor across the same interface. Thus, the slave/sensor can deduct the communicated DT from the time it receives the real time hardware event (i.e., at the "Real T_Ph time"), and therefore arrive at the Starting T_Ph time when the T_Ph should have actually been started, against slave/sensor time base (i.e., the timer/counter of the sensor). Furthermore, the information indicating the DT period may indicate that the delay period is approximately 1/n as long as a time phase period T_Ph, where n is a power of two (e.g., 1, 2, 4, 8 . . . ). Based on the timing of the synchronization message and the information indicative of the DT periods, the sensors/slaves may determine the expected beginning of new T_Ph periods.

Based on the timing of the information message 520 including the DT information, sensors receiving this information may determine the expected beginning of a next or new T_Ph period, indicated by pulse or timestamp 524 in timeline 510, for example, showing processing of the information message 520 has occurred. With the determined start of the next T_Ph period the sensors may then transmit data at particular predetermined repetitions or system awake intervals within the T_Ph period as may be seen in timeline 512. When the sensors' timers are synchronized, sensor data may be transmitted at each timestamp or sample frequency of each of the synchronized sensors as may be seen in timeline 512. Thus, the sensor data is synchronized (see generally 526 in FIG. 5) and this data will be synchronized on the interface (see 528 in timeline 506, as an example) and will be able to be read more efficiently by the host controller as the data sets are read within a same system awake interval during which sensor polling is accomplished. It is further noted that according to an aspect the system awake periods are adjustable.

FIG. 5 illustrates that a synchronized system affords adjustment of the frequency and phase of the sensors' sampling periods. The host controller or master sends the synchronization information (i.e., information message 520 or Synchronization event) with a repetition period of T_Ph. As discussed before, the time phase period T_Ph may be a relatively large time interval, such as 1 second, and is exactly divisible by the Least Common Multiple of the sampling periods of the sensors coupled to the host controller. In practical cases however, it is not always possible to have a suitable correspondence between different Slaves/Sensors and their different ODRs, such that a Least Common Multiple would have a useful value. In such cases, the synchronization process could either adjust some of the ODRs or, in the worst case, synchronize the sensors in more, but smaller groups.

It is further noted that for the synchronized timeline examples in FIG. 5, after the host controller transmits the phase and frequency information (T_Ph), the sensors will have their data ready at mutually synchronized moments as illustrated in timeline 512. This reduces the number of host controller awake periods and minimizes the expended energy needed to read the desired sensor data.

It is also noted that a host controller 305 may be configured to transmit various commands and corresponding data over the interface 317, such as an I2C or I3C interface. In a particular aspect, a host controller will transmit an ODR command and data to particular sensors or devices that sets or establishes the running output data rate for one or more sensors. The ODR value indicates the number of samples taken by a sensor in a given period of time and is also specific to each particular sensor or device sampling and transmitting data over the interface. Additionally, a host controller also issues a command and data that communicates the time phase period T_Ph. In an aspect, the T_Ph may be expressed in the number of sampling periods of a chosen ODR. Another command and data that may be issued by the host controller is a resolution ratio (RR) representing the resolution ratio of the DT. The RR may be expressed in the number of divisions of a selected power of 2 of the T_Ph time, as will be discussed later in more detail.

As mentioned before, the ST and DT could be sent across many different types of interfaces and the methodology disclosed herein is not limited to any one type of interface. In some aspects, the methodology may be used on several or multiple interfaces as well as multiple interface protocols where several sensors may be synchronized against the internal time base of the host controller. This is possible because the hardware event (i.e., the ST and/or the ST and DT together or paired) do not need to be sent at an exact or precise timing with regard to the correct start of T_Ph due to the measurement and transmission of the delay time.

As disclosed herein, the start of a T_Ph interval may correspond to a time when most of the sensors would collect data simultaneously, and the sampling moments of several sensors should coincide at least once during one T_Ph period. These coincident sampling moments allows the data transfer from all the sensors to occur during a same transaction, as may be also seen in timeline 512, for example, and sampling moments may be seen at the vertical dashed lines in FIG. 5 (See e.g., line 530 in FIG. 5). Also, in an aspect the T_Ph value is generally chosen such that the sensors' timers keep 0.1% accuracy with respect to T_Ph duration, which generally is about one (1) second.

Figure 6:
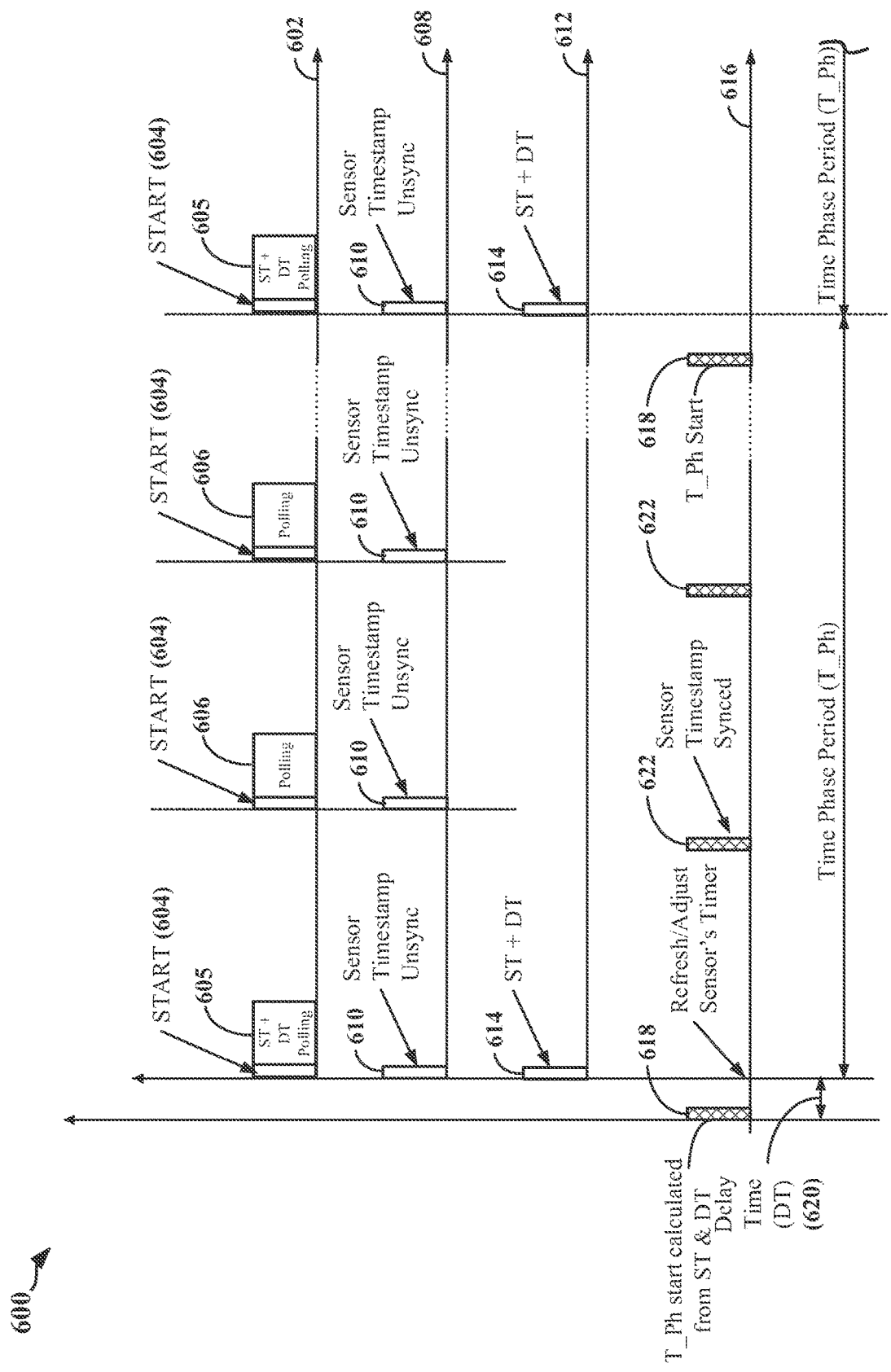
FIG. 6 illustrates a timeline diagram showing an example of a synchronization procedure on an interface.

FIG. 6 illustrates a timeline diagram 600 showing an example of a synchronization procedure on an interface, such as and I2C or I3C Bus. In particular, FIG. 6 illustrates a timeline of communications over the interface between a controller (e.g., the host controller 305) and a sensor (e.g., the sensor 310) in which the timing of the sensor is adjusted to provide efficiency in coordinating multiple sensors and to guarantee that sensor reads do not duplicate data or miss desired data. As part of this sensor timing adjustment, the example of FIG. 6 utilizes the information message (e.g., information message 520) including an ST message followed by or paired with a delay time DT message for synchronization of sensor timers to the host controller.

The timeline 602 illustrates an example of read events by a host controller 305 of communications emanating from a sensor (e.g., 310) on the interface. The communication includes START events 604, in the case of I2C or I3C, followed by the messages 606 that carry data and control information from the sensor. A first portion of information 605 may include the ST and the DT, with the remainder of the communication information including typical communications exchanging polled data and control information. According to an aspect, if the ST is part of I2C or I3C communications, the sensor internally records when the ST occurs and uses that information if it is followed by a command indicating that it is used as a synchronization pulse or event. In another aspect, the synchronization events are mutually identifiable hardware events between controller and sensor, which may be determined a priori. In an aspect, the hardware event may be one of various START conditions known to I2C or I3C interfaces, such as a START condition defined by a falling edge of the SDA line, but the event is certainly not limited to such. Subsequent communications within the T_Ph period may include polling or other commands and/or messages 606.

In some aspects, the messages 606 including polling messages elicit a response from the sensors in which the sensors may transmit sensor sample data back to the host controller. The sensors may also transmit timestamps indicating the transmission time based on their own respective sensor timers. The timestamps may be in any suitable form, e.g., as part of an I2C or I3C bus response message along with the sensor sample data, as a dedicated message if a protocol faster than I2C or I3C (e.g., SPI) is used, or on a separate connection between the processor and the sensor.

The next timeline 608 illustrates the timing when the sensor timestamps 610 are recorded on the sensor itself, which corresponds in time to the START event 604. These sensor timestamps 610 in timeline 608 represent an unsynchronized operation. In an aspect, the sensor may eventually transmit these timestamps back to the host controller along with any corresponding sensor data. These sensor timestamps 610 may be configured in many forms, such as part of I2C or I3C communication (i.e., on SDA and SCL lines), on a separate line, or even a complete message if the communication system is faster than I2C, such as SPI as one example.

The timeline 612 illustrates a combined ST and DT message 614 (e.g., the information message 520 of FIG. 5) that can be used for synchronizing the host controller and the sensor. The ST message is validated by the DT message, which gives the time delay that is usable by a sensor for timing correction. In one aspect, the correction for the delay arising in the host controller may be different from sensor clock rate correction, which is determined within the sensor based upon the time between ST pulses. In another aspect, the ST and DT portions of the combined ST and DT message 614 may be distinguished from one another by setting different values in a Defining Byte field for each message.

As disclosed herein, the host controller may determine or measure the DT 620, which is the time from an expected start of a T_Ph period (sequence period) as indicated on timeline 616 at timestamp pulse 618 at T_Ph start that is in synchronization. Additional sensor timestamps 622 during the T_Ph period are synched with the host controller. The time correction communicated by the DT message accounts for the time between the start of the T_Ph and when the ST message is sent out on the interface. As disclosed herein, this delay may occur because there is hardware and software overhead in the host controller. The hardware overhead is usually known ahead of time from the latency of digital logic of the host controller. On the other hand, the software overhead latency may be less stable and may arise from competing priorities in the operating system or the control software. For example, the software may be handling priority interrupts during the time when the ST is about to be sent. This can cause sending of the ST to be delayed. Furthermore, these delays can change from cycle to cycle. Thus, sending the measured DT 620 with the ST affords the ability for sensors to adapt to the delay of the beginning of the T_Ph period and the sending of the ST. Thus, the DT message effectively qualifies each ST time stamp. According to other aspects, it is noted that the ST message is preferably sent as soon after a START Condition (and, for a Direct Message, the Slave Address) as possible, providing enough time for the DT Message to be sent and received. Additionally, the DT Message should arrive before a next shortest polling time window, as will be discussed in more detail later. According to still further aspects, the DT Message may contain either a time delay between the START Condition and the required T_Ph Start, or else an abort order for the current synchronization window.

In operation, each sensor may be configured to record the value of its internal timer at the moment when the hardware event is detected. In an example, the SDA falling edge of the START Condition may constitute the hardware event to be detected on the interface in the example of using an I2C or I3C Bus. In the latter example, a record of the last START Condition may be stored in a register or similar device for storing a value. When the sensor recognizes either its slave address or a Broadcast command, and the ST message, each sensor or slave device is configured to then use the stored START Condition time as a reference for the start time of the new T_Ph period. Then, upon recognizing the subsequent DT Message, which is part of the information message 520, 614, each sensor or slave device may either correct the T_Ph start time and T_Ph duration (if needed) with respect to its internal timer, or aborts the current synchronization procedure, preserving the internal timer's running parameters. When the T_Ph interval expires (e.g., after approximately 1.0 second in one example) the host controller or master repeats the synchronization event by then sending a next ST message followed by a DT message in the manner described above.

During configuration or set up of a system to implement the synchronized timing of FIG. 6, various commands may be issued by a master or host controller 305 to the sensors (e.g., sensor/slave 310) in particular I2C and I3C systems, for example, although the functionalities thereof are not necessarily limited to I2C and I3C systems. As disclosed herein, the host controller may issue an ODR command for each sensor. In an aspect, the ODR command may communicate to a sensor the running ODR. In another aspect, the ODR command code may be a single byte (0xXX) along with another byte of sensor specific data.

Another parameter during configuration is the command to set the duration of T_Ph time period (i.e., the Synchronization Event repetition period or synchronization period), which may also be referred to as the TPH command. This command sets the repetition rate of the T_Ph. In an aspect, the ST message may include this TPH command code within the Defining Byte field, followed by one or more specific data bytes concerning the particular time settings or values.

Yet another command that may be used during configured is a time unit (TU) command, which may be specific to each or all sensors. This command sets the value of the time unit transferred to the sensor or slave devices. In an aspect, the ST message may include this TPH command code within the Defining Byte field, followed by one or more specific data bytes concerning the particular time settings or values.

Additionally, another command during configuration of a system is the RR command sent by the host controller to the sensors. The RR command provides a division factor that can be applied for calculating resolution steps of the T_Ph time for the DT command. The use of relative division of the T_Ph for transmitting the delay time avoids the need for either the host controller or the sensors to know each-others' real timer or clock value.

The calculation of a T_Ph resolution step can be determined by multiplying the corresponding T_Ph time period by the RR. The RR, as described before, is expressed in the number of divisions by a selected inverse power of 2 of the T_Ph time. As an example, the RR values may be expressed as $2^{-x}$ where x may be integer values from 11 to 14 (thus, the RR values range from $2^{-11}$ to $2^{-14}$). In terms of the structure of the RR command or message, the two least significant bits (LSBs) in the RR message can used to indicate to the sensors which T_Ph division factor is used for calculating the time resolution steps from integer values 11 to value 14 that are inverse powers of 2 (e.g., 2'b00↔2^(−11), 2'b01↔2^(−12), 2'b10↔2^(−13) 2'b11↔2^(−14)). Thus, if a T_Ph period is assumed to be 1 second (i.e., 1000 ms) and the RR value is set at $2^{-11}$, for example, the resolution step time would be 1000 ms×$2^{-11}$ or 488 µs. Since the division factor is expressed as an integer power of two, it is noted the multiplying operation is a simple right shift by the same number of positions as the positive integer exponent of the division value. In an aspect, the DT message may be constructed with one byte such that 7 bits could be used for communicating the delay steps and a most significant bit (MSB) would indicate an abort (although the message is not necessarily limited to one byte of data). Thus, the absolute maximum delay time would be a time period that corresponds to 127 resolution steps. Based on the resolution step time determined as a division factor of the T_Ph period and the predetermined number of resolution steps for a maximum delay time (DT) in which the ST+DT message should be transmitted, the maximum delay time may be computed. For example, if the resolution step time is 488 is from the example above, then the maximum DT correction range would be 488 µs×127 or 62.01 ms. Table 1 below illustrates examples of various numbers of maximum ST+DT delay times (or DT correction range) given different T_Ph periods and RR values from 11 to 14.

TABLE 1

| T_Ph (ms) | $2^{(-x)}$ | RR step (µs) | Max ST delay for DT = 127 RR steps (ms) | Max ST delay for DT = 127 RR steps (% T_Ph) |
|---|---|---|---|---|
| 200 | 11 | 98 | 12.40 | 6.20% |
| 200 | 12 | 49 | 6.20 | 3.10% |
| 200 | 13 | 24 | 3.10 | 1.55% |
| 200 | 14 | 12 | 1.55 | 0.78% |
| 500 | 11 | 244 | 31.01 | 6.20% |
| 500 | 12 | 122 | 15.50 | 3.10% |
| 500 | 13 | 61 | 7.75 | 1.55% |
| 500 | 14 | 31 | 3.88 | 0.78% |
| 1000 | 11 | 488 | 62.01 | 6.20% |
| 1000 | 12 | 244 | 31.01 | 3.10% |
| 1000 | 13 | 122 | 15.50 | 1.55% |
| 1000 | 14 | 61 | 7.75 | 0.78% |

It is noted that it in particular systems it is essential that the sensors have data available, even if an ST+DT message cannot be sent or the system is in an error state. This is so because the sensor data could be necessary for other devices or processes not directly under the host controller's control. Since certain aspects of the presently disclosed techniques provide that the ST and DT are paired together and acknowledged as such by the sensor device, if the ST command cannot be given inside a DT correction range, it will have to be provided much later. In such case, the ST message must be followed by the DT with the abort sync order. Subsequently, a correct ST will follow validated by its paired DT.

It is noted here that the RR provides a compact way of expressing the delay time, suitable for any real-time units on which the timers of the host controller/master and sensor/slave are based. By specifying the DT in divisions of the power of two numbers of the whole T_Ph, the resolution of the result is implicitly set. In contrast to the efficiency of using the RR to express the DT, it would not be very useful or efficient to express the DT in milliseconds where the T_Ph is 200 ms, or to express DT in microseconds for a T_Ph of 1 second or longer.

Other factors affecting operation of the synchronization disclosed herein include the consideration that the START event of the ST+DT message must arrive on the bus at least after an expected drift of the synchronized timers to catch the slowest possible sensor or slave. Furthermore, due to host controller uncertainty due to hardware, firmware, and software lag, where this uncertainty is termed "jitter" herein, the SDA falling edge for a START event for the ST+DT message could come even later. However, the START event condition of the ST+DT message cannot come later than a timing acceptable to read the correct data; i.e., the read needs to occur before new data starts filling the output registers or a FIFO buffer at the sensors. Accordingly, methods and apparatus are also contemplated for ensuring that drift of the synchronized timers and host controller jitter is accounted for and mitigated.

In an aspect, the term "jitter" may connote the sum of the statistical uncertainty of the host controller issuing the ST message at an ideal or expected time (e.g., if the uncertainty is ±1 ms, then the total uncertainty is 1 ms+1 ms=2 ms for the whole interval to cover all the possible variations). Additionally, there is a range of timer timings on sensors, which may be due to jitter including quantization errors. This range of timings may be expressed as a percentage of the T_Ph period measured in the timer of the host controller. For a given jitter of the whole system, a maximum T_Ph can be determined.

Figure 7:
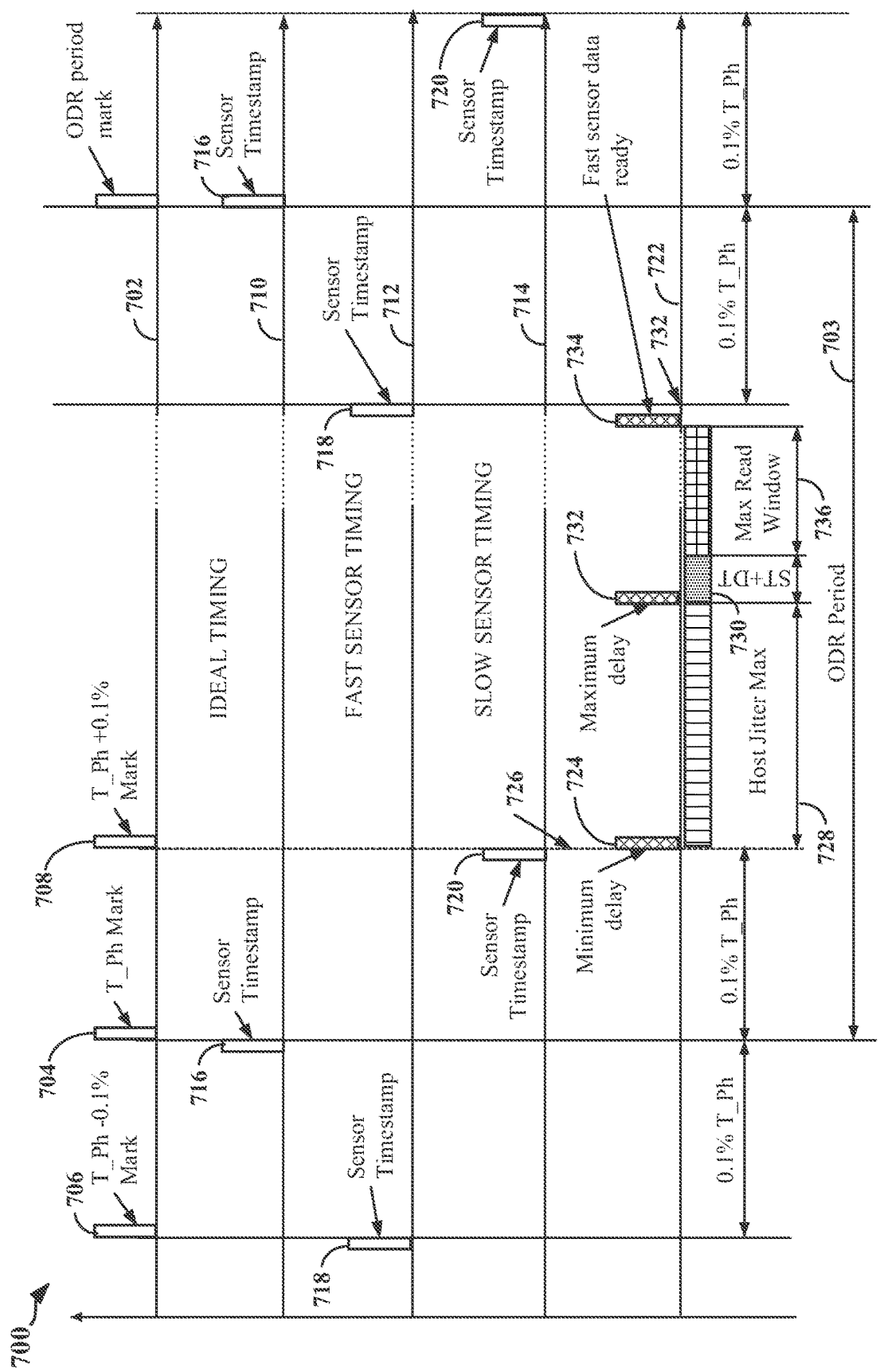
FIG. 7 illustrates a timeline diagram showing setting of polling timing by accounting for jitter and synchronization messaging timing.

FIG. 7 illustrates a timeline diagram 700 showing setting of polling timing by accounting for jitter and synchronization messaging timing. In particular, FIG. 7 illustrates the effects of jitter on sensor synchronization and polling, and the determination of a maximum read window for ensuring proper polling or reading of data from sensors in a system. The first timelines 702 illustrates shows three possible T_Ph period marks 704, 706, 708 at the beginning of an ODR period or polling period 703. The mark 704 represents an ideal timing point, whereas mark 706 and 708 represent the fast and slow limits, respectively (e.g., −0.1% of the T_Ph period at mark 706 and +0.1% of the T_Ph period at mark 708, as merely one example). It is noted that the ideal, fast, and slow marks are only shown for illustration purposes as a visualization of where these timings would occur. The next three timelines 710, 712, and 714 represent ideal, fast, and slow timers or clocks on a sensor where the deviations fast or slow from the ideal represents the range of acceptability for a sensor. The amount of time the sensor time stamp is off in time (i.e., the fast timestamp 718, the ideal timestamp 716, and the slow timestamp 720) is determined by the timer or clock generation of the sensor. This timing can be affected by temperature, supply voltage, and other elements of the sensor's operation.

The timeline 722 illustrates times that the host controller may poll the sensor by taking into consideration the different situations of ideal, fast, or slow sensor timing. The minimum delay to start polling as shown by pulse 724 must be late enough to ensure that even slow sensor timing has completed data sampling as illustrated by the pulse 724 occurring in time just after the timestamp 720 of the slow sensor timing as may be seen at time point 726. This timing is possible when the host controller can guarantee polling at that exact time. However, and as disclosed herein, the host controller itself may be subject to variation when it is available to actually effect polling due to delays in the hardware, firmware, and software. This variation is shown as the Host Jitter Maximum 728, where this maximum jitter represents the longest possible delay time, the end of which may be considered to be a maximum delay timing for the ST+DT information message 730. The Host Jitter Maximum 728 time period may be known a priori or based on measurements or calculations performed by the host controller.

After the Host Jitter Maximum 728 time has elapsed, the host controller can perform resynchronization by sending an ST+DT information message 730, with an attendant period of time needed for transmitting the ST+DT information message 730. To capture the proper sample of sensor data on the next sensor Output Data Period, the host controller polls the sensor before the fastest sensor has updated (See fast sensor timestamp 718 indicating its data is ready just before time point 732), and is shown at mark 734 as the maximum time for a sensor read window (i.e., Max Read Window 736) before the fast sensor has its data ready. The time for the Max Read Window will need to be non-negative to ensure that the window of time is extant. To guarantee that the Max Read Window timing is a non-negative value for a given Host Jitter Maximum 728 and a given requirement on the fast and slow sensor time, the rate of sending the ST+DT information message 730 is set low enough that the Max Read Window is non-negative. Accordingly, the determination of the Max Read Window 736 includes actively setting or adjusting the ST+DT information message 730. Furthermore, it will be appreciated that the methodology of FIG. 7 allows for computation of determination of the number of ODR periods (e.g., polling period 703) for which sensor data may be sampled during a synchronization period (i.e., a T_Ph). For example, the number of ODR periods allowing for sampling of sensor data before the fastest possible sensor sampling timing would change the data to be read at a next ODR (i.e., timestamp 718 and time point 732) may be determined. From this determination of the number of ODR periods (or polling timing or the number of polling cycles) during a synchronization period (T_Ph) (or resynchronization if occurring after initial synchronization) may be set or determined by the host controller.

It is further noted that range of fastest to slowest sensor timings (i.e., 706 to 708) as represented in FIG. 7 do not necessarily represent a particular number of sensors, but rather illustrates the range of the possible variations of a particular sensor's timings (or alternatively this could be the range of possible timer variations of a number of sensors collectively), and the number of sensors in the physical system may be one or more where the range encompasses the fastest and slowest possible timings of the one or more sensors.

According to another aspect, the host controller may monitor the gradual drift of the sensor timers from the transmitted timestamps (e.g., 716, 718, 720, or other times not shown by FIG. 7) indicating time instants when data becomes available to the host controller. From this monitoring, the determinations of the minimum and/or maximum delay times (i.e., the range of variation between the slowest and fastest sensor timing) may be adjusted dynamically.

Synchronization-Capable Slave Devices

In many instances, sensors are implemented as slave devices with limited processing capabilities. Sensors may be implemented as digital sensors that are driven by an internal clock generator. Relevant functions of the sensor may be controlled using the time watermarks disclosed herein. The time watermarks may be counted or measured using a base clock provided by an internal clock generator.

Figure 8:
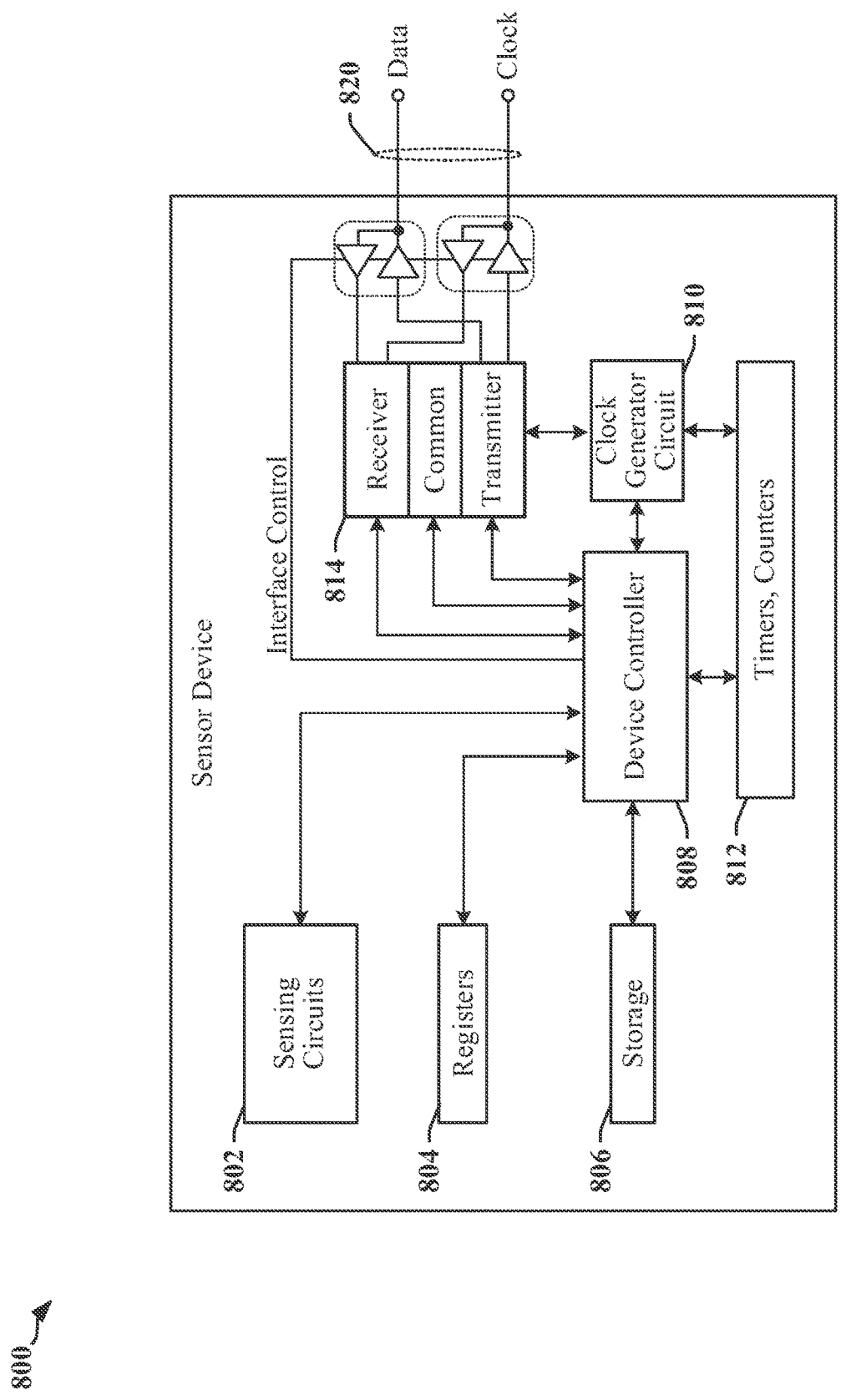
FIG. 8 illustrates a sensor that may be adapted in accordance with certain aspects disclosed herein.

FIG. 8 illustrates a sensor 800 that may be adapted in accordance with certain aspects disclosed herein. In one example, the sensor 800 may be coupled to through a two-wire serial bus 820 operated in accordance with an I3C, I2C, RFFE, SPMI or other protocol. The sensor 800 may be manufactured at low cost and with minimal complexity. For example, a device controller 808 may be implemented as a finite state machine or low-cost microcontroller. The operation of the device controller 808 may be directed or controlled by instructions or other information provided in an on-board or external storage device 806. In various examples, the device controller 808 may cycle through a control loop that determines when certain functions are to be performed, including sensor read functions and communication functions. Certain activities controlled by the control loop may be triggered by timers or counters 812 that count clock pulses in one or more signals provided by a clock generation circuit 810. In one example, a timer may generate a signal, interrupt or event when a configured number of clock cycles has been counted in a clock signal. In another example, a counter may count clock cycles in the clock signal and generate a signal, interrupt or event when the counter value reaches zero.

The device controller 808 may respond to a first timer or counter event by reading data from a sensing circuit 802.

The sensing circuit 802 may be coupled to an external or internal device that measures some aspect of the environment in which the sensor 800 resides. For example, the sensing circuit 802 may obtain readings of ambient temperature, strain at a surface, device orientation, air pressure, etc. from a transducer or instrument. The sensing circuit 802 may provide the readings or manipulated versions of the readings in one or more registers 804 accessible to the device controller 808. The device controller 808 may respond to the first timer or counter event, or a second timer or counter event by communicating the register values through the serial bus 820. Communicating the register values may be accomplished by activating a bus interface 814 such that the bus interface 814 and/or device controller 808 respond to read commands directed to the registers 804.

The device controller 808 may have limited processing capability. In many low-cost sensors 800, the device controller 808 is used to enable and disable certain functions and move data between registers. In these sensors 800, the inclusion of more complex functions in the device controller 808, such as arithmetic logic units, can negatively affect cost and power consumption of the sensor 800. In these types of sensors, synchronization of timing circuits between the sensor 800 and other devices conventionally requires participation by a host application processor. When large numbers of sensors 800 are deployed in some conventional systems, the synchronization burden may degrade performance of the host application processor and may eventually overwhelm the capabilities of the host application processor and the serial bus 820. Certain aspects disclosed herein enable a sensor 800 with limited processing capability to self-synchronize to timing signals and/or events provided by the host application processor without ongoing intervention of the host application processor. In one example, the host application processor may configure certain synchronization parameters during device initialization, or during system configuration or reconfiguration and participate no further in the calculation of offsets, delays and other timing information that enables the sensor 800 to be synchronized to the host application processor and/or to other sensors.

ODR is a sensor-specific parameter that defines the number of samples available in a given time unit, where the time unit may be one second, for example. A typical sensor 800 supports a limited number of ODR values. The value of the ODR affects the method of processing raw data, which is processed between samples. The sampling period is defined based on a watermark associated with, or implemented using a base counter. In one example, a 1 MHz clock base clock is used to clock the base counter, and an ODR=100 Hz yields a 10,000 count between adjacent samples.

A host device may provide hardware-recognizable synchronization events, such as STs generated at periods determined or configured by higher-level applications. An ST command may distinguish STs from a multitude of similar hardware events. The STs might not appear on the bus at the correct time. The host device may be configured to send information to a target sensor 800 identifying the delay between an ST and the correct time of the sync event. The information may be transferred in a DT message or command. The DT value may be expressed in time units equivalent. In one example, a resolution step (Rstep) may be expressed as divisions by the power of 2 of the total duration between adjacent synchronizing ticks. The exponent of the power of two is denoted as a resolution ratio. In this example, the interval at which the adjacent synchronization ticks are sent (i.e. T_Ph) may be defined in numbers of sensor samples (i.e. TPH).

A slave device that incorporates the sensor 800, is expected to calculate a time at which one or more samples are to be captured. The slave device may adjust the moment at which a sample is taken based on certain calculations involving synchronization information. Programmatically, a simplest approach to timing the acquisition of samples employs digital multipliers and dividers for calculating the sampling moment. Some microcontroller-based slave devices may be equipped with digital multipliers and dividers, often with double-precision capabilities. However, most slave devices used as sensors 800 are relatively simple devices and may be implemented using finite state machines or other logic circuits that can operate without a microcontroller. The addition of multipliers or dividers to such slave devices would represent an unacceptable increase in cost.

Certain aspects disclosed herein provide a design for a slave device that can calculate sampling intervals and sampling moments using basic digital procedures and simple digital logic. In one example, a comprehensive design can be provided using only basic adders/subtractors, digital comparators and/or digital counters.

Certain aspects disclosed herein provide a "synchronization for sensors" (S4S) technique in which a host may transfer the target ODR during system configuration, where the T_Ph is expressed in the number of samples taken by the slave device (TPH value) and the depth of RR, which is the exponent of the respective power of 2. A slave device is configured with the timing for capturing a sample, including a sample water mark (SWM) assigned to each available ODR. The total number of counts for the T_Ph is calculated. Then the ST/DT command pair provide the information necessary for calculating the correct T_Ph in slave device clock numbers, as correlated to host timing. The slave device may then calculate the adjusted time watermark for the sampling moments.

In conventional systems, the initial T_Ph is calculated using a multiplier to determine the product of TPH and SWM. According to certain aspects disclosed herein, a counter that is initiated at the start of synchronization period (start of T_Ph) may be permitted to run until acquisition of the last sample, as specified by the TPH value. The use of a counter can avoid the use of the multiplier.

According to certain aspects, the master may cause the T_Ph calculation to be adjusted. The slave device may timestamp a synchronization hardware event that is identified by the ST/DT command pair. The master sends the slave a SYNC Tick command which defines a hardware event that is used by the slave to create the timestamp. The time-stamped event serves as a reference for the slave device. However, the timestamp may be delayed by the effects of one or more environmental conditions, and/or conditions resulting from a busy bus or busy master. The slave device may accomplish synchronization by deducting the number of resolution steps based on the value provided by the DT command. In conventional systems, the number of resolution steps is multiplied by DT to obtain a number to be deducted from the timestamp.

According to certain aspects disclosed herein, the timestamp may be adjusted without multiplication. The timestamp may be logged as SDA_TS. The DT transfers the number of time units elapsed from the correct end of T_Ph to the moment when the synchronizing hardware event was provided on the bus. The slave device may then deduct the corresponding number of clocks from the timestamp it has taken. The slave device may initially multiply the DT value and the Rstep, which is calculated using RR. The calculated value may be subtracted from the timestamp. The RStep typically has a small value and is a power of 2, and a right-shift may be performed that results in a deep truncation of the value. The deep truncation of the value may result in large quantization error, that is exacerbated when multiplied.

Figure 9:
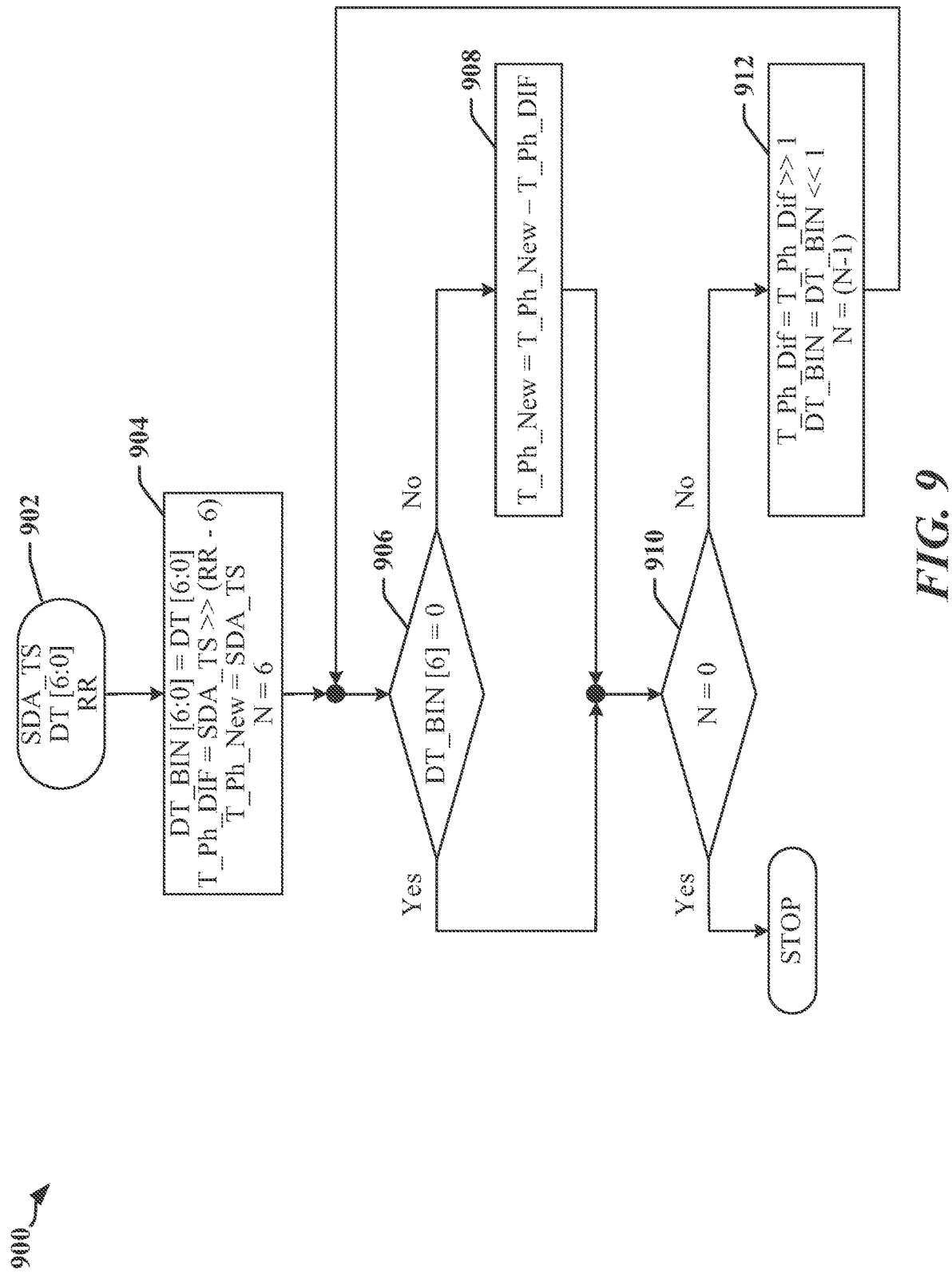
FIG. 9 is a flowchart illustrating a procedure for adjusting a sampling time interval in accordance with certain aspects disclosed herein.

FIG. 9 is a flowchart 900 that illustrates a process for multiplying the DT value and calculating a value to be deducted from the timestamp. According to certain aspects disclosed herein, step-wise subtractions involving the delay time are performed by a calibration circuit, where tranches are right-shifted based on the binary value of the DT. In the illustrated example, where DT=5 (binary 101), conventional systems would multiply the resolution step by 5 before deduction. According to certain aspects disclosed herein, adjustment of the timestamp may be accomplished using a bit-by-bit approach. At block 902, the calibration circuit receives the RR, the DT and the initial timestamp (SDA_TS). At block 904, a loop counter (N) is initiated, a DT counter is loaded with the value of DT, an initial T_Ph_DIF value is set to the value of SDA_TS, rotated right RR-6 bits, and the T_Ph_New is set to the value of SDA_TS. At block 906, the calibration circuit determines the value of bit DT_BIN[6]. If DT_BIN[6] is cleared (i.e. equal to 0), then no deduction is made. If DT_BIN[6] is set (i.e. equal to 1), then a deduction is made at block 908 by subtracting the T_Ph_DIF value from T_Ph_New.

If the loop counter has reached zero, then at block 910 the calibration circuit may terminate the procedure. If the loop counter is not zero, then at block 912, the calibration circuit rotates T_Ph_Dif right by one bit, rotates DT_BIN left by 1 bit and decrements the loop counter. The procedure repeats beginning at block 906.

In the example, the first deduction corresponds to the LSB of the resolution step, which here is '1,' and one unit of the TPH value is deducted from the timestamp. The TPH value and DT are then shifted right. The DT LSB is now '0' and no deduction is made. The TPH value and DT are then shifted right again. The DT LSB is now '1' and one unit of the twice-shifted TPH value is deducted from the timestamp.

In this manner, use of a multiplier is avoided and the quantization error is reduced. A shift register and digital comparator (to monitor the LSB of the shifted TPH) enables the appropriate deduction. The right-shift can be applied to either the running T_Ph or to the SDA_TS. In a first iteration of the procedure, the use of the initially calculated value provides a suitable accuracy for real-life applications. The resulting new T_Ph may be referred to as T_Ph_New.

Tables 2 and 3, below illustrate examples of the use of the procedure illustrated in FIG. 9. In these examples, SDA_TS is initialized to 4,020,000, RR is set to 12, DT is set to 31, and the target T_Ph_New value is 3,989,803.73. A Bit selector for DT_Bin is illustrated as an 8-bit value, although the example uses fewer DT_Bin bits (DT_Bin[6:0]). The examples illustrated in Tables 1 and 2 differ in initial T_Ph_Diff values.

TABLE 2

| Bit | Bit Selector | Value | T_Ph_Diff | T_Ph_New |
|---|---|---|---|---|
| 7 | 10000000 | 0 | 125625 | 4020000 |
| 6 | 01000000 | 0 | 62812 | 4020000 |
| 5 | 00100000 | 0 | 31406 | 4020000 |
| 4 | 00010000 | 16 | 15703 | 4004297 |
| 3 | 00001000 | 8 | 7851 | 3996446 |
| 2 | 00000100 | 4 | 3925 | 3992521 |
| 1 | 00000010 | 2 | 1962 | 3990559 |
| 0 | 00000001 | 1 | 981 | 3989578 |

TABLE 3

| Bit | Bit Selector | Value | T_Ph_Diff | T_Ph_New |
|---|---|---|---|---|
| 7 | 10000000 | 0 | 124674 | 4020000 |
| 6 | 01000000 | 0 | 62337 | 4020000 |
| 5 | 00100000 | 0 | 31168 | 4020000 |
| 4 | 00010000 | 16 | 15584 | 4004416 |
| 3 | 00001000 | 8 | 7792 | 3996624 |
| 2 | 00000100 | 4 | 3896 | 3992728 |
| 1 | 00000010 | 2 | 1948 | 3990780 |
| 0 | 00000001 | 1 | 974 | 3989806 |

Figure 10:
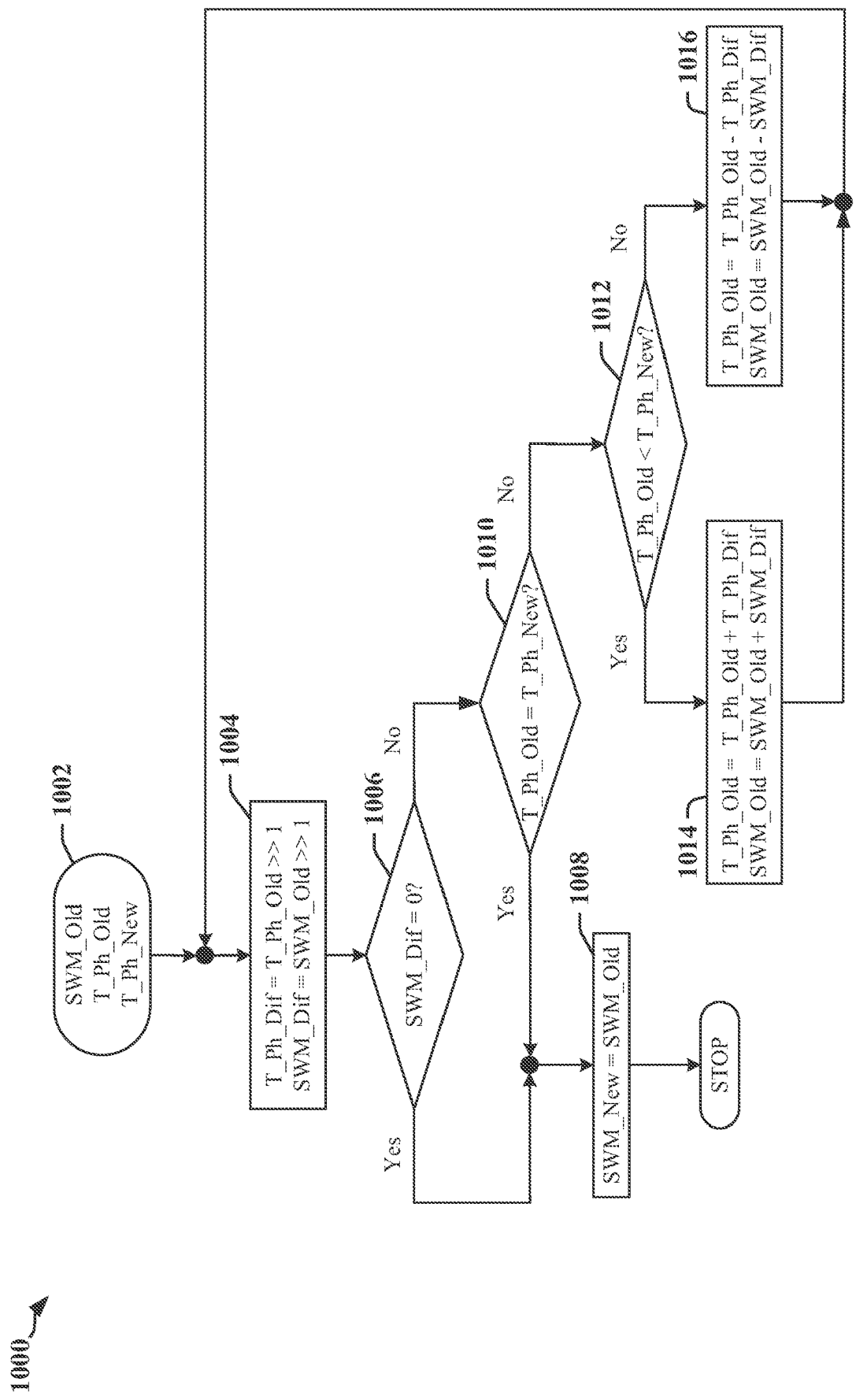
FIG. 10 is a flowchart illustrating a procedure for calculating a watermark time in accordance with certain aspects disclosed herein.

FIG. 10 is a flowchart 1000 that illustrates a process for calculating the sample water mark (SWM) by mirroring an iterative adjustment of the old T_Ph (T_Ph_Old) to obtain a new T_Ph (T_Ph_New), in accordance with certain aspects disclosed herein. In one aspect, mirroring may be implemented by adjusting the SWM using an iterative digital approximation that is proportionate to the iterative digital approximation used to obtain T_Ph_New. For example, the SWM difference value (SWM_Dif) used to adjust SWM in an iteration may be obtained by shifting SWM right by the same number of bits used to shift T_Ph to obtain the T_Ph difference value (T_Ph_Dif) for the same iteration. The use of mirroring to obtain a corrected SWM can eliminate the need for multipliers and dividers. In each iteration, a new value for T_Ph may be obtained by digital maneuvering of the previous T_Ph value using shifting, addition and/or subtraction. A new value for SWM may be obtained using the previous SWM value and the same digital maneuvering used to obtain the new value for T_Ph in each iteration. In some aspects, the digital maneuvering may be characterized as a scaling procedure, that may be represented as:

$$New_{SWM} = Old_{SWM} \times \frac{New_{TPH}}{Old_{TPH}}.$$

At block 1002 of the flowchart 1000, the calibration circuit may receive the previous SWM (SWM_Old), T_Ph_Old and T_Ph_New. The calibration procedure iteratively modifies T_Ph_Old from block 1004 until T_Ph_Old approaches T_Ph_New as closely as possible. At block 1004, the calibration circuit may set T_Ph_Dif to the value of T_Ph_Old after a one-bit rotation right, and may set SWM_Dif to the value of SWM_Old after a one-bit rotation right.

At block 1006, the calibration circuit determines if SWM_Dif has a non-zero value. If SWM_DIF is zero, then SWM_New is set to the current value of SWM_Old at block 1008, and the procedure is terminated. If SWM_DIF is non-zero, the procedure continues at block 1010.

At block 1010, the calibration circuit determines whether T_Ph_Old and T_Ph_New are equal. If T_Ph_Old and T_Ph_New are equal, then SWM_New is set to the current value of SWM_Old at block 1008, and the procedure is terminated. If T_Ph_Old and T_Ph_New are not equal, the procedure continues at block 1012.

At block 1012, the calibration circuit determines whether adjustments to T_Ph_Old and SWM_Old are additive or subtractive. If T_Ph_Old is less than T_Ph_New, then T_Ph_Old and SWM_Old are increased at block 1014 by adding T_Ph_Dif and SWM_Dif, respectively. If T_Ph_Old is greater than T_Ph_New, then T_Ph_Old and SWM_Old are decreased at block 1016 by subtracting T_Ph_Dif and SWM_Dif, respectively.

The procedure returns to block 1004 for another iteration after adjusting T_Ph_Old and SWM_Old.

At each stage, the presently modified T_Ph_Old is compared to the target T_Ph_New (see block 1012). If T_Ph_Old is smaller, the next stage is calculated by adding to it the value of its value shifted right by one position. If T_Ph_Old is larger, the next stage is calculated by subtracting from it the value of its value shifted right by one position. The same procedure is applied in parallel to the SWM_Old; the numbers are calculated by shifting right the corresponding value of the SWM_Old. The final result is SWM_New. The process continues until either the modified T_Ph_Old=T_Ph_New or the added/subtracted value of the SWM_Old=0.

The procedure illustrated in FIG. 10 iteratively adjusts the current value (T_Ph_Old) up or down using a difference value that is decreased in each iteration. The target value (T_Ph_New) is accomplished when no difference is observed between old and new values.

Tables 4 and 5, below illustrate examples of the use of the iterative procedure illustrated FIG. 10. Tables 4 and 5 illustrate convergence achieved by the procedure. The T_Ph value can be used to represent a synchronization period that occurs between an ST-DT pair. The synchronization period may be measured as a number of samples taken by a sensor associated with a slave device. In one example, a sensor may be adapted to capture a sample when a counter reaches a SWM represented as a number of clocks of an internal base clock generator. The synchronization period may be calculated as the product of the SWM value and the TPH number. In the examples provided in the tables, the initial SWM is selected to be 100,000 and the synchronization period has a duration of 6 samples. The T_Ph value is initially:

$$6 \times 100{,}000 = 600{,}000.$$

For Table 4, the target T_Ph value is 610,948, while for Table 5, the target T_Ph sampling period is 610,619. According to certain aspects, a slave device may discover the 600,000 value using a counter that counts 6×SWM durations (100,000 internal clock periods) SWM. Conventional systems employ a multiplier to obtain the synchronization period. According to certain aspects disclosed herein, the 600,000 value is adjusted by iterative approximation and provides an adjusted value, which is 610,948 in Table 4 for example. While adjusting the synchronization period, the same digital approximation procedures are applied to adjust the SWM value. The approximation procedures include adding or subtracting a right-shifted reference value. The approximation procedures permit the adjustment to accomplished without a divider. A divider of sufficient precision would divide 610,948 by 6 (the number of samples) to obtain a correct value of 610,755.17. The procedures disclosed herein derive a calculated SWM of 101,824 from of the initial 100,000. The slave uses the SWM value for sampling and, based on the calculated 101,824 SWM value, the slave counts 610,944 base clocks between samples. The resultant error is 0.0309% with respect to a correctly calculated synchronization period (610,755.17) obtained using double-precision multipliers/dividers.

TABLE 4

| | Period sampling | T_Ph_Iteration | Period_Diff | T_Ph_Dif |
|---|---|---|---|---|
| 1 | 100,000 | 600,000 | 50,000 | 300,000 |
| 2 | 150,000 | 900,000 | 25,000 | 150,000 |
| 3 | 125,000 | 750,000 | 12,500 | 75,000 |
| 4 | 112,500 | 675,000 | 6,250 | 37,500 |
| 5 | 106,250 | 637,500 | 3,125 | 18,750 |
| 6 | 103,125 | 618,750 | 1,562 | 9,375 |
| 7 | 101,563 | 609,375 | 781 | 4,687 |
| 8 | 102,344 | 614,062 | 390 | 2,343 |
| 9 | 101,954 | 611,719 | 195 | 1,171 |
| 10 | 101,759 | 610,548 | 97 | 585 |
| 11 | 101,856 | 611,133 | 48 | 292 |
| 12 | 101,808 | 610,841 | 24 | 146 |
| 13 | 101,832 | 610,987 | 12 | 73 |
| 14 | 101,820 | 610,914 | 6 | 36 |
| 15 | 101,826 | 610,950 | 3 | 18 |
| 16 | 101,823 | 610,932 | 1 | 9 |
| 17 | 101,824 | 610,941 | 0 | 4 |
| 18 | 101,824 | 610,945 | 0 | 2 |
| 19 | 101,824 | 610,947 | 0 | 1 |
| 20 | 101,824 | 610,948 | 0 | 0 |
| 21 | 101,824 | 610,948 | 0 | 0 |
| 21 | 101,824 | 610,948 | 0 | 0 |
| 23 | 101,824 | 610,948 | 0 | 0 |
| 24 | 101,824 | 610,948 | 0 | 0 |

Resultant T_Ph  610,944
Correct T_Ph  610,755.17
Error %  0.0309%

TABLE 5

| | Period sampling | T_Ph_Iteration | Period_Diff | T_Ph_Dif |
|---|---|---|---|---|
| 1 | 100,000 | 600,000 | 50,000 | 300,000 |
| 2 | 150,000 | 900,000 | 25,000 | 150,000 |
| 3 | 125,000 | 750,000 | 12,500 | 75,000 |
| 4 | 112,500 | 675,000 | 6,250 | 37,500 |
| 5 | 106,250 | 637,500 | 3,125 | 18,750 |
| 6 | 103,125 | 618,750 | 1,562 | 9,375 |
| 7 | 101,563 | 609,375 | 781 | 4,687 |
| 8 | 102,344 | 614,062 | 390 | 2,343 |
| 9 | 101,954 | 611,719 | 195 | 1,171 |
| 10 | 101,759 | 610,548 | 97 | 585 |
| 11 | 101,856 | 611,133 | 48 | 292 |
| 12 | 101,808 | 610,841 | 24 | 146 |
| 13 | 101,784 | 610,695 | 12 | 73 |
| 14 | 101,772 | 610,622 | 6 | 36 |
| 15 | 101,766 | 610,586 | 3 | 18 |
| 16 | 101,769 | 610,604 | 1 | 9 |
| 17 | 101,770 | 610,613 | 0 | 4 |
| 18 | 101,770 | 610,617 | 0 | 2 |
| 19 | 101,770 | 610,619 | 0 | 1 |
| 20 | 101,770 | 610,618 | 0 | 0 |
| 21 | 101,770 | 610,618 | 0 | 0 |
| 21 | 101,770 | 610,618 | 0 | 0 |
| 23 | 101,770 | 610,618 | 0 | 0 |
| 24 | 101,770 | 610,618 | 0 | 0 |

Resultant T_Ph  610,620
Correct T_Ph  610,755.17
Error %  −0.0221%

The procedures disclosed herein, including the procedures illustrated in FIGS. 9 and 10 provide examples in which large value synchronization periods can be iteratively corrected using basic digital circuits and/or functions to perform digital approximation, rather than using double-precision multipliers and/or dividers.

Examples of Processing Circuits and Methods

Figure 11:
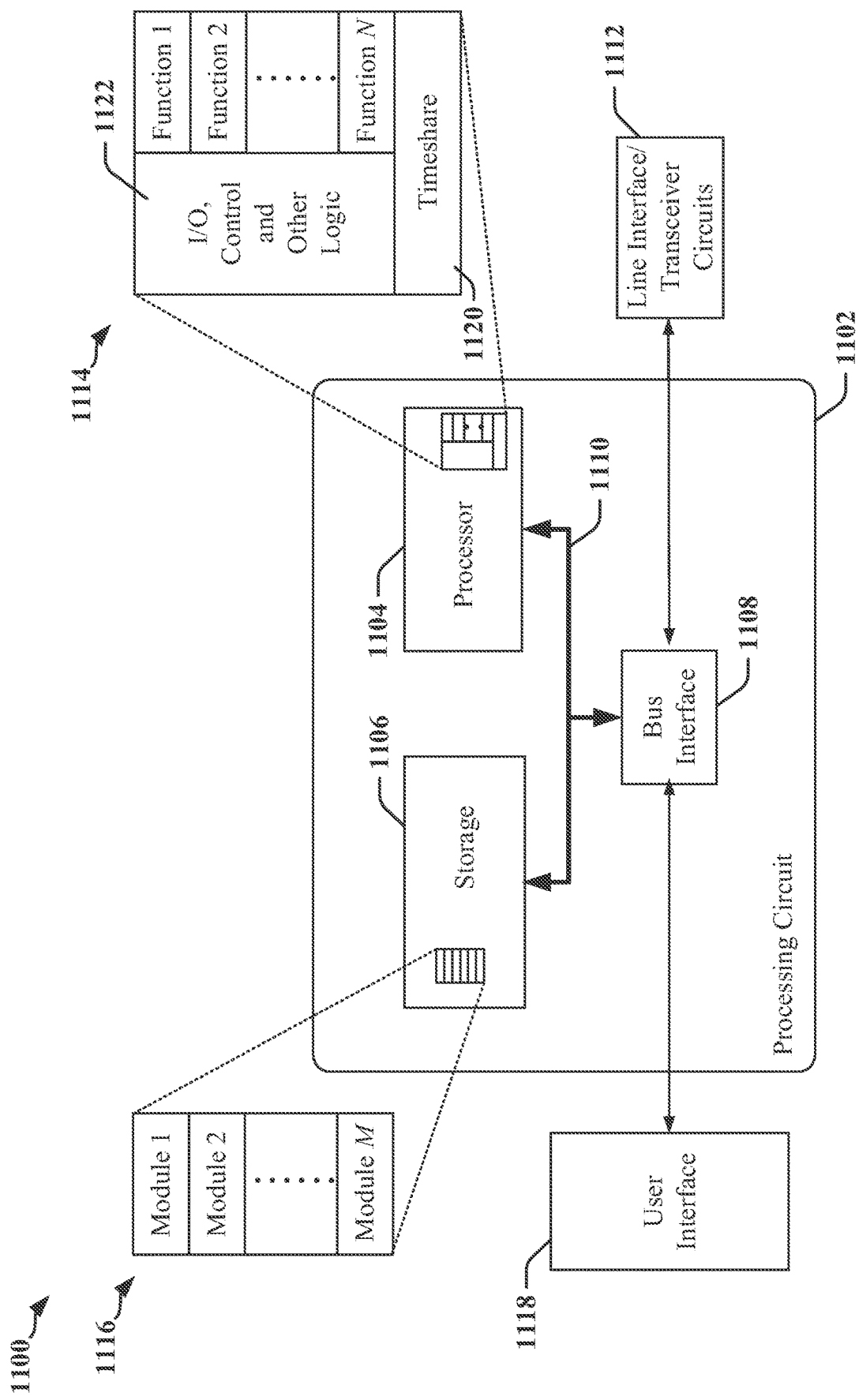
FIG. 11 is a block diagram illustrating an example of an apparatus employing a processing circuit that may be adapted according to certain aspects disclosed herein.

FIG. 11 is a diagram illustrating an example of a hardware implementation for an apparatus 1100 employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112. A transceiver 1112 may be provided for each networking technology supported by the processing circuit. In some instances, multiple networking technologies may share some or all of the circuitry or processing modules found in a transceiver 1112. Each transceiver 1112 provides a means for communicating with various other apparatus over a transmission medium. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
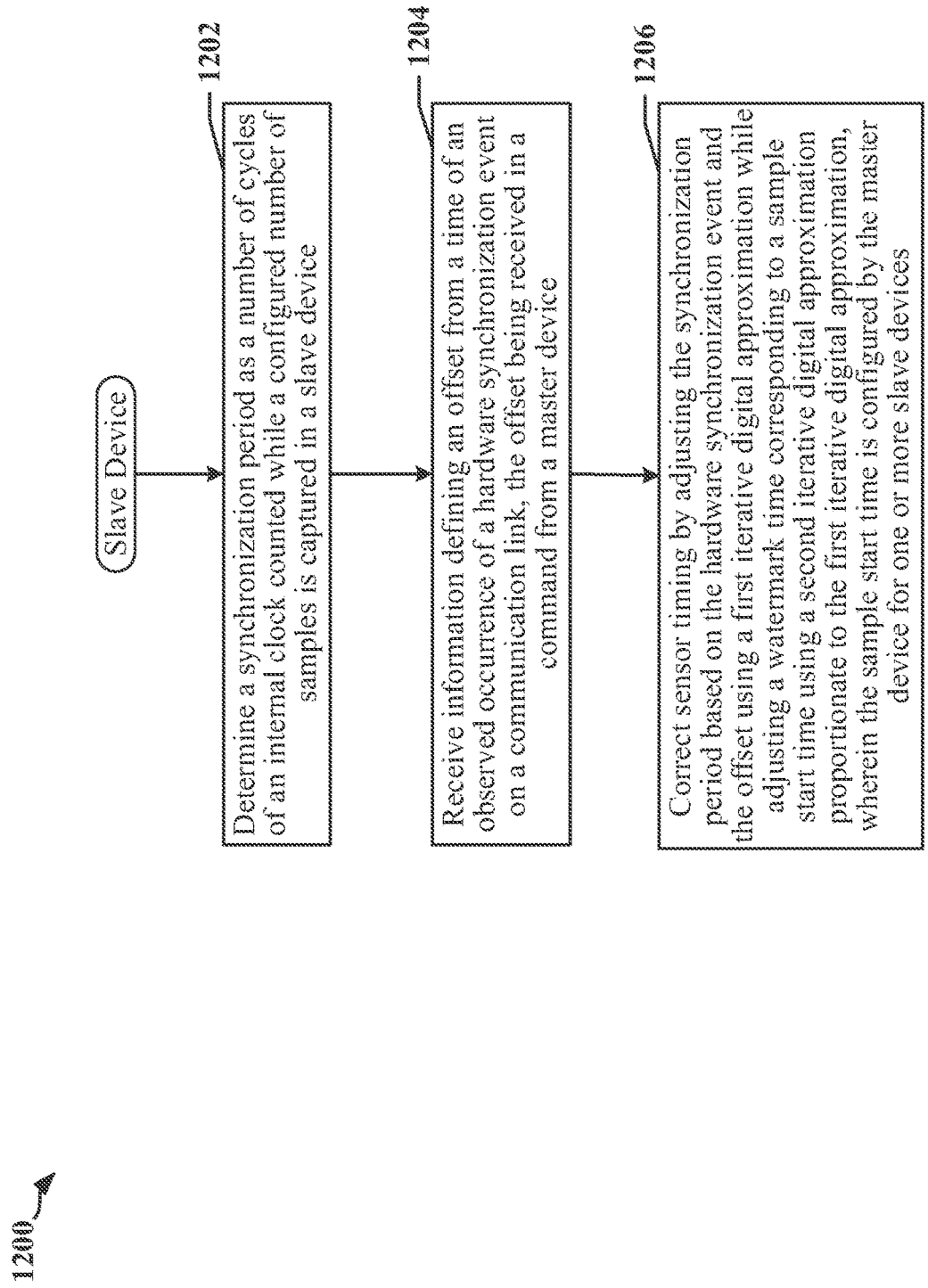
FIG. 12 is a flowchart illustrating certain operations of a slave device coupled to a serial bus and configured in accordance with certain aspects disclosed herein.

FIG. 12 is a flowchart 1200 of a method for calculating sensor timing corrections that may be performed at a slave device coupled to a master device. The slave device may be incorporated in, or associated with a sensor.

At block 1202, the slave device may determine a synchronization period as a number of cycles of an internal clock counted while a configured number of samples is captured in a slave device.

At block 1204, the slave device may receive information defining an offset from a time of an observed occurrence of a hardware synchronization event on a communication link, the offset being received in a command from a master device.

At block 1206, the slave device may correct sensor timing by adjusting the synchronization period based on the hardware synchronization event and the offset using a first iterative digital approximation while adjusting a watermark time corresponding to a sample start time using a second iterative digital approximation proportionate to the first iterative digital approximation. The sample start time may be configured by the master device for one or more slave devices.

In one example, adjusting the time interval between samples includes subtracting a multiple of the offset in tranches. Each tranche may be right-shifted a number of times based on the value of bits in a binary representation of the offset.

In various examples, the sample start time is determined based on the hardware synchronization event and the offset. The hardware synchronization event may be a Sync Tick. The offset may include a Delay Time. The information defining the offset may include a resolution ratio used to calculate resolution of steps used to adjust the time interval between samples.

In certain examples, adjusting the time interval includes receiving a current time interval and an old time interval, and repeating a set of calculations until a difference between the current time interval and the old time interval is less than a desired maximum difference. The calculations may include right-shifting a binary representation of the current time interval to obtain a difference value, subtracting the difference value from the current time interval to obtain a new time interval when the current time interval is greater than the old time interval, adding the difference value to the current time interval to obtain the new time interval when the current time interval is less than the old time interval, storing the current time interval as the old time interval, and storing the new time interval as the current time interval. The set of calculations may be implemented in combinational logic and/or shift registers, adders and digital comparators. Adjusting the time interval may include receiving a watermark time, and the set of calculations may also include right-shifting a binary representation of the watermark time to obtain a watermark difference, subtracting the watermark difference from the watermark time when the current time interval is greater than the old time interval, and adding the watermark difference to the watermark time when the current time interval is less than the old time interval.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for calculating sensor timing corrections, comprising:
    determining a synchronization period as a number of cycles of an internal clock counted while a configured number of samples is captured in a slave device;
    receiving information defining an offset from a time of an observed occurrence of a hardware synchronization event on a communication link, the offset being received in a command from a master device, wherein the information defining the offset includes a resolution ratio used to calculate resolution of steps used to adjust the synchronization period; and
    correcting sensor timing by adjusting the synchronization period based on the hardware synchronization event and the offset using a first iterative digital approximation while adjusting a watermark time corresponding to a sample start time using a second iterative digital approximation proportionate to the first iterative digital approximation,
    wherein the sample start time is configured by the master device for one or more slave devices.

2. The method of claim 1, wherein adjusting the synchronization period comprises:
subtracting a multiple of the offset in tranches at the slave device, each tranche being right-shifted a number of times based on value of bits in a binary representation of the offset.

3. The method of claim 1, wherein the sample start time is determined based on the hardware synchronization event and the offset.

4. The method of claim 1, wherein the hardware synchronization event comprises a Sync Tick.

5. The method of claim 1, wherein the offset comprises a Delay Time.

6. The method of claim 1, wherein adjusting the synchronization period comprises:
receiving by the slave device, a current time interval and an old time interval at a synchronization circuit; and
repeating at the slave device until a difference between the current time interval and the old time interval is less than a desired maximum difference:
right-shifting a binary representation of the current time interval to obtain a difference value;
subtracting the difference value from the current time interval to obtain a new time interval when the current time interval is greater than the old time interval;
adding the difference value to the current time interval to obtain the new time interval when the current time interval is less than the old time interval;
storing the current time interval as the old time interval; and
storing the new time interval as the current time interval.

7. The method of claim 6, further comprising:
receiving the watermark time at the synchronization circuit; and
repeating at the slave device until the difference between the current time interval and the old time interval is less than the desired maximum difference:
right-shifting a binary representation of the watermark time to obtain a watermark difference;
subtracting the watermark difference from the watermark time when the current time interval is greater than the old time interval; and
adding the watermark difference to the watermark time when the current time interval is less than the old time interval.

8. A sensor comprising:
a communications transceiver coupled to a serial bus; and
combinational logic configured to:
determine a synchronization period as a number of cycles of an internal clock counted while a configured number of samples is captured in the sensor;
receive information defining an offset from a time of an observed occurrence of a hardware synchronization event on a communication link, the offset being received in a command from a master device, wherein the information defining the offset includes a resolution ratio used to calculate resolution of steps used to adjust the synchronization period; and
correct sensor timing by adjusting the synchronization period based on the hardware synchronization event and the offset using a first iterative digital approximation while adjusting a watermark time corresponding to a sample start time using a second iterative digital approximation proportionate to the first iterative digital approximation,
wherein the sample start time is configured by the master device for one or more slave devices.

9. The sensor of claim 8, wherein the combinational logic comprises:
a shift register; and
subtraction logic,
wherein the shift register and the subtraction logic are configured to adjust the synchronization period by subtracting a multiple of the offset in tranches, each tranche being right-shifted a number of times based on value of bits in a binary representation of the offset.

10. The sensor of claim 8, wherein the sample start time is determined based on the hardware synchronization event and the offset.

11. The sensor of claim 8, wherein the hardware synchronization event comprises a Sync Tick.

12. The sensor of claim 8, wherein the offset comprises a Delay Time.

13. The sensor of claim 8, wherein the combinational logic comprises one or more shift registers, an adder and a subtractor, and the combinational logic is configured to adjust the synchronization period by:
receiving a current time interval and an old time interval at a synchronization circuit; and
repeating until a difference between the current time interval and the old time interval is less than a desired maximum difference:
right-shifting a binary representation of the current time interval to obtain a difference value;
subtracting the difference value from the current time interval to obtain a new time interval when the current time interval is greater than the old time interval;
adding the difference value to the current time interval to obtain the new time interval when the current time interval is less than the old time interval;
storing the current time interval as the old time interval; and
storing the new time interval as the current time interval.

14. The sensor of claim 13, wherein the combinational logic is further configured to:
receive the watermark time at the synchronization circuit; and
until the difference between the current time interval and the old time interval is less than the desired maximum difference, repetitively:
right-shift a binary representation of the watermark time to obtain a watermark difference;
subtract the watermark difference from the watermark time when the current time interval is greater than the old time interval; and
add the watermark difference to the watermark time when the current time interval is less than the old time interval.

15. A slave device, comprising:
means for determining a synchronization period as a number of cycles of an internal clock counted while a configured number of samples is captured in the slave device;
means for receiving information defining an offset from a time of an observed occurrence of a hardware synchronization event on a communication link, the offset being received in a command from a master device, wherein the information defining the offset includes a resolution ratio used to calculate resolution of steps used to adjust the synchronization period; and means for correcting sensor timing,
wherein the sensor timing is corrected by adjusting the synchronization period based on the hardware synchronization event and the offset using a first iterative digital approximation while adjusting a watermark time corresponding to a sample start time using a second iterative digital approximation proportionate to the first iterative digital approximation, and
wherein the sample start time is configured by the master device for one or more slave devices.

16. The slave device of claim 15, wherein the means for correcting sensor timing is configured to:
subtract a multiple of the offset in tranches, each tranche being right-shifted a number of times based on value of bits in a binary representation of the offset.

17. The slave device of claim 15, wherein the sample start time is determined based on the hardware synchronization event and the offset.

18. The slave device of claim 15, wherein the hardware synchronization event comprises a Sync Tick and the offset comprises a Delay Time.

19. The slave device of claim 15, wherein the means for correcting sensor timing is configured to:
receive a current time interval and an old time interval at a synchronization circuit; and
repeat until a difference between the current time interval and the old time interval is less than a desired maximum difference:
right-shift a binary representation of the current time interval to obtain a difference value;
subtract the difference value from the current time interval to obtain a new time interval when the current time interval is greater than the old time interval;
add the difference value to the current time interval to obtain the new time interval when the current time interval is less than the old time interval;
store the current time interval as the old time interval; and
store the new time interval as the current time interval.

20. The slave device of claim 19, wherein the means for correcting sensor timing is further configured to:
receive the watermark time at the synchronization circuit; and
repeat until the difference between the current time interval and the old time interval is less than the desired maximum difference:
right-shift a binary representation of the watermark time to obtain a watermark difference;
subtract the watermark difference from the watermark time when the current time interval is greater than the old time interval; and
add the watermark difference to the watermark time when the current time interval is less than the old time interval.

21. A non-transitory processor-readable storage medium having code stored thereon that, when executed by a processor of a slave device, causes the processor to:
determine a synchronization period as a number of cycles of an internal clock counted while a configured number of samples is captured in the slave device;
receive information defining an offset from a time of an observed occurrence of a hardware synchronization event on a communication link, the offset being received in a command from a master device, wherein the information defining the offset includes a resolution ratio used to calculate resolution of steps used to adjust the synchronization period; and
correct sensor timing by adjusting the synchronization period based on the hardware synchronization event and the offset using a first iterative digital approximation while adjusting a watermark time corresponding to a sample start time using a second iterative digital approximation proportionate to the first iterative digital approximation,
wherein the sample start time is configured by the master device for one or more slave devices.

22. The storage medium of claim 21, wherein the code causes the processor to adjust the synchronization period by:
subtracting a multiple of the offset in tranches, each tranche being right-shifted a number of times based on value of bits in a binary representation of the offset.

23. The storage medium of claim 21, wherein the sample start time is determined based on the hardware synchronization event and the offset.

24. The storage medium of claim 21, wherein the hardware synchronization event comprises a Sync Tick and the offset comprises a Delay Time.

25. The storage medium of claim 21, wherein the code causes the processor to adjust the synchronization period by:
receiving a current time interval and an old time interval at a synchronization circuit; and
repeating until a difference between the current time interval and the old time interval is less than a desired maximum difference:
right-shifting a binary representation of the current time interval to obtain a difference value;
subtracting the difference value from the current time interval to obtain a new time interval when the current time interval is greater than the old time interval;
adding the difference value to the current time interval to obtain the new time interval when the current time interval is less than the old time interval;
storing the current time interval as the old time interval; and
storing the new time interval as the current time interval.

26. The storage medium of claim 25, wherein the code causes the processor to adjust the watermark time by:
receiving the watermark time at the synchronization circuit; and
repeating until the difference between the current time interval and the old time interval is less than the desired maximum difference:
right-shifting a binary representation of the watermark time to obtain a watermark difference;
subtracting the watermark difference from the watermark time when the current time interval is greater than the old time interval; and
adding the watermark difference to the watermark time when the current time interval is less than the old time interval.

* * * * *